US012801892B2

(12) United States Patent
Lv et al.

(10) Patent No.: US 12,801,892 B2
(45) Date of Patent: Nov. 17, 2026

(54) METHOD FOR FUSING OPERATORS OF NEURAL NETWORK, AND RELATED PRODUCT

(71) Applicant: Shanghai Cambricon Information Technology Co., Ltd, Shanghai (CN)

(72) Inventors: Yashuai Lv, Shanghai (CN); Jiali Liang, Shanghai (CN); Xiaofu Meng, Shanghai (CN); Zhenyu Su, Shanghai (CN)

(73) Assignee: Shanghai Cambricon Information Technology Co., Ltd., Shanghai (CN)

( * ) Notice: Subject to any disclaimer, the term of this patent is extended or adjusted under 35 U.S.C. 154(b) by 689 days.

(21) Appl. No.: 18/284,419

(22) PCT Filed: May 26, 2022

(86) PCT No.: PCT/CN2022/095109

§ 371 (c)(1),
(2) Date: Apr. 3, 2024

(87) PCT Pub. No.: WO2022/247880

PCT Pub. Date: Dec. 1, 2022

(65) Prior Publication Data

US 2024/0330643 A1 Oct. 3, 2024

(30) Foreign Application Priority Data

May 26, 2021 (CN) ........................ 202110580167.X

(51) Int. Cl.
*G06N 3/04* (2023.01)
*G06F 9/54* (2006.01)
*G06N 3/0464* (2023.01)

(52) U.S. Cl.
CPC ................ *G06N 3/04* (2013.01); *G06F 9/54* (2013.01); *G06N 3/0464* (2023.01)

(58) Field of Classification Search
CPC ........ G06N 3/04; G06N 3/0464; G06N 3/063; G06N 20/00; G06N 3/092; G06N 3/0499;
(Continued)

(56) References Cited

U.S. PATENT DOCUMENTS 10,872,298 B2 * 12/2020 Harris ................. G06F 16/9024
11,809,849 B1 * 11/2023 Zheng ..................... G06F 13/28
(Continued)

FOREIGN PATENT DOCUMENTS

CA 3106673 A1 * 2/2020 ........... G06N 3/0499
CA 3101214 A1 * 4/2020 ........... G06F 12/082
(Continued)

OTHER PUBLICATIONS

International Search Report for PCT/CN2022/095109 mailed on Jul. 27, 2022.
(Continued)

*Primary Examiner* — Steven P Sax
(74) *Attorney, Agent, or Firm* — The PL Law Group, PLLC

(57) ABSTRACT

A system for fusing operators of a neural network is included in a combined processing apparatus. The combined processing apparatus includes an interface apparatus and other processing apparatus. A computing processing apparatus interacts with other processing apparatus to jointly complete a computing operation specified by a user. The combined processing apparatus further includes a storage apparatus. The storage apparatus is connected to the apparatus and other processing apparatus, respectively. The storage apparatus is configured to store data of the apparatus and other processing apparatus. A solution of the present disclosure improves efficiency of various operations in data processing fields including, for example, an artificial intelligence field, thus reducing overall overheads and costs of the operations.

17 Claims, 13 Drawing Sheets

(58) Field of Classification Search

CPC ........ G06N 20/10; G06N 20/20; G06N 3/045; G06N 3/09; G06N 3/094; G06N 3/10; G06N 3/08; G06F 9/54; G06F 13/28; G06F 16/3329; G06F 15/7807; G06F 16/9024; G06F 12/0862; G06F 17/16; G06Q 10/04

See application file for complete search history.

(56) References Cited

U.S. PATENT DOCUMENTS

| | | | | |
|---|---|---|---|---|
| 11,809,981 | B1 * | 11/2023 | Jain | G06N 3/0464 |
| 12,423,074 | B1 * | 9/2025 | Fan | G06F 9/54 |
| 12,694,296 | B1 * | 7/2026 | Zheng | G06N 3/084 |
| 2021/0073169 | A1 * | 3/2021 | Wang | G06F 15/7807 |
| 2021/0073170 | A1 * | 3/2021 | Liao | G06F 15/7807 |
| 2021/0182036 | A1 * | 6/2021 | Shafiq | G06N 3/063 |
| 2021/0209139 | A1 * | 7/2021 | Wu | G06F 16/3329 |
| 2021/0248460 | A1 * | 8/2021 | Sykora | G06N 3/092 |
| 2021/0319329 | A1 * | 10/2021 | Yang | G06F 16/9024 |
| 2022/0075948 | A1 * | 3/2022 | Yuan | G06N 20/00 |
| 2022/0092386 | A1 * | 3/2022 | Zhou | G06N 3/063 |
| 2023/0236888 | A1 * | 7/2023 | Zhang | G06N 3/063<br>718/104 |

FOREIGN PATENT DOCUMENTS

| | | | | | |
|---|---|---|---|---|---|
| CN | 109543825 | A | * | 3/2019 | G06N 3/063 |
| CN | 109740751 | A | | 5/2019 | |
| CN | 109754073 | A | | 5/2019 | |
| CN | 109766996 | A | | 5/2019 | |
| CN | 110490309 | A | | 11/2019 | |
| CN | 111459464 | A | | 7/2020 | |
| CN | 111860650 | A | | 10/2020 | |
| CN | 112463159 | A | * | 3/2021 | G06N 3/045 |
| CN | 112465108 | A | | 3/2021 | |
| CN | 112598121 | A | | 4/2021 | |
| CN | 112711422 | A | | 4/2021 | |
| CN | 111553466 | B | * | 3/2024 | G06N 3/045 |
| CN | 112801404 | B | * | 3/2024 | G06Q 10/04 |
| CN | 114692860 | B | * | 6/2026 | G06N 3/10 |
| DE | 102021201597 | A1 | * | 8/2022 | G06F 17/16 |
| JP | 2023502575 | A | * | 1/2023 | G06N 3/094 |
| JP | 2023507059 | A | * | 2/2023 | G06N 3/09 |
| KR | 102565098 | B1 | * | 8/2023 | G06N 3/08 |
| WO | WO 2020/154830 | A1 | | 8/2020 | |
| WO | WO-2021045976 | A1 | * | 3/2021 | G06N 3/045 |
| WO | WO-2022087788 | A1 | * | 5/2022 | G06N 3/0499 |

OTHER PUBLICATIONS

Zhang. Fangfang, "Design and Implementation of Deep Learning Compiler Based on CNN Accelerator", Chinese Master's Theses Full-Text Database, Information Science & Technology, May 15, 2021, No. 5, pp. 24-28, doi.org/10.27389/d.cnki.gxadu.2020.002467 (English translation of Abstract is submitted herewith.).

Fang. Jingzhi et al., "Optimizing DNN computation graph using graph substitutions", Proceedings of the VLDB Endowmen, Sep. 14, 2020, vol. 13, No. 12, pp. 2734-2746.

Gang Li et al., "Edge and Node Graph Convolutional Neural Network for Human Action Recognition", Chinese Control and Decision Conference, 2020, DOI: 10.1109/CCDC49329.2020.9163951 (English translation of Abstract is submitted herewith.).

* cited by examiner

METHOD FOR FUSING OPERATORS OF NEURAL NETWORK, AND RELATED PRODUCT

PRIORITY

This application claims benefit under 35 U.S.C. 119, 120, 121, or 365(c), and is a National Stage entry from International Application No. PCT/CN2022/095109 filed on May 26, 2022, which claims priority to the benefit of Chinese Patent Application No. 202110580167.X filed in the Chinese Intellectual Property Office on May 26, 2021, the entire contents of which are incorporated herein by reference.

BACKGROUND

1. Technical Field

The present disclosure relates to the field of computers, and more specifically, the present disclosure relates to operator fusion of a neural network.

2. Background Art

Image supersampling refers to restoring a low-resolution image to a high-resolution image, which is a very important technology in the fields of computer vision and image processing. The image supersampling is widely used in the fields of medical image, monitoring, and security. So far, a large number of classical supersampling methods have been proposed in academic and practical applications, including a prediction-based method, an edge-based method, a statistical method, a block-based method, and a sparse representation method.

With the rapid development of deep learning technology in recent years, deep learning-based supersampling technology has achieved very good results. Different deep learning methods have been applied to image supersampling, such as a convolution neural network and a generative adversarial network. Convolution operation is a foundation of a deep learning neural network, and while deep learning supersampling networks differ greatly from each other, they are essentially a set of operation components that include a lot of convolution computing. An output of a supersampling deep learning network is usually a high-resolution image with a large amount of data, which makes the space and computing amount required in the operation process very large.

Due to the computationally intensive nature of the deep learning neural network, a graphics processing unit (GPU) with multiple levels of on-chip storage or a deep learning-dedicated processor is currently commonly used for acceleration, including a deep learning-based supersampling network. However, inputs, outputs, and intermediate computing results of the deep learning-based supersampling network are very large, and generally may not reside in a multilevel high-speed on-chip storage of a processor, so the utilization rate of the multilevel high-speed on-chip storage is low, and the acceleration effect is not obvious.

SUMMARY

One purpose of the present disclosure is to solve low utilization of a multilevel high-speed on-chip storage and low acceleration effect during the neural network operation process in the prior art.

A first aspect of the present disclosure provides a method for fusing operators of a neural network, including: constructing a directed computing graph of the neural network, where the directed computing graph includes a plurality of nodes connected by directed edges: traversing the plurality of nodes to determine whether a traversed node satisfies a preset condition; and determining an operator corresponding to the node that satisfies the preset condition as a to-be-fused operator to perform fusion to generate a fusion operator.

A second aspect of the present disclosure provides an electronic device, including: one or a plurality of processors; and a memory, on which a computer-executable instruction is stored, where when the computer-executable instruction is run by the one or the plurality of processors, the electronic device performs the above method.

A third aspect of the present disclosure provides a computer-readable storage medium, including a computer-executable instruction, where when the computer-executable instruction is run by one or a plurality of processors, the method described above is performed.

At least one beneficial effect of the present disclosure is that operators that satisfy a condition in a neural network may be fused, thus saving the overall running time of the neural network.

BRIEF DESCRIPTION OF THE DRAWINGS

By reading the following detailed description with reference to drawings, the above-mentioned and other objects, features and technical effects of exemplary implementations of the present disclosure will become easier to understand. In the drawings, several implementations of the present disclosure are shown in an exemplary manner rather than a restrictive manner, and the same or corresponding reference numerals indicate the same or corresponding parts.

DETAILED DESCRIPTION OF EMBODIMENTS

Technical solutions in embodiments of the present disclosure will be described clearly and completely hereinafter with reference to drawings in the embodiments of the present disclosure. Obviously, embodiments to be described are merely some rather than all embodiments of the present disclosure. All other embodiments obtained by those skilled in the art based on the embodiments of the present disclosure without creative efforts shall fall within the scope of protection of the present disclosure.

It should be understood that terms such as "first", "second", "third", and "fourth" that appear in the claims, the specification, and the drawings are used for distinguishing different objects rather than describing a specific order. It should be understood that terms "including" and "comprising" used in the specification and the claims indicate the presence of a feature, an entity, a step, an operation, an element, and/or a component, but do not exclude the existence or addition of one or more of other features, entities, steps, operations, elements, components, and/or collections thereof.

It should also be understood that terms used in the specification of the present disclosure are merely intended to describe a specific embodiment rather than to limit the present disclosure. As being used in the specification and the claims of the present disclosure, unless the context clearly indicates otherwise, singular forms such as "a", "an", and "the" are intended to include plural forms. It should also be understood that a term "and/or" used in the specification and the claims refers to any and all possible combinations of one or more of relevant listed items and includes these combinations.

As being used in the specification and the claims of the present disclosure, a term "if" may be interpreted as "when", or "once" or "in response to a determination" or "in response to a case where something is detected" depending on the context. Similarly, depending on the context, a clause "if it is determined that" or "if [a described condition or event] is detected" may be interpreted as "once it is determined that", or "in response to a determination", or "once [a described condition or event] is detected", or "in response to a case where [a described condition or event] is detected".

Figure 1:
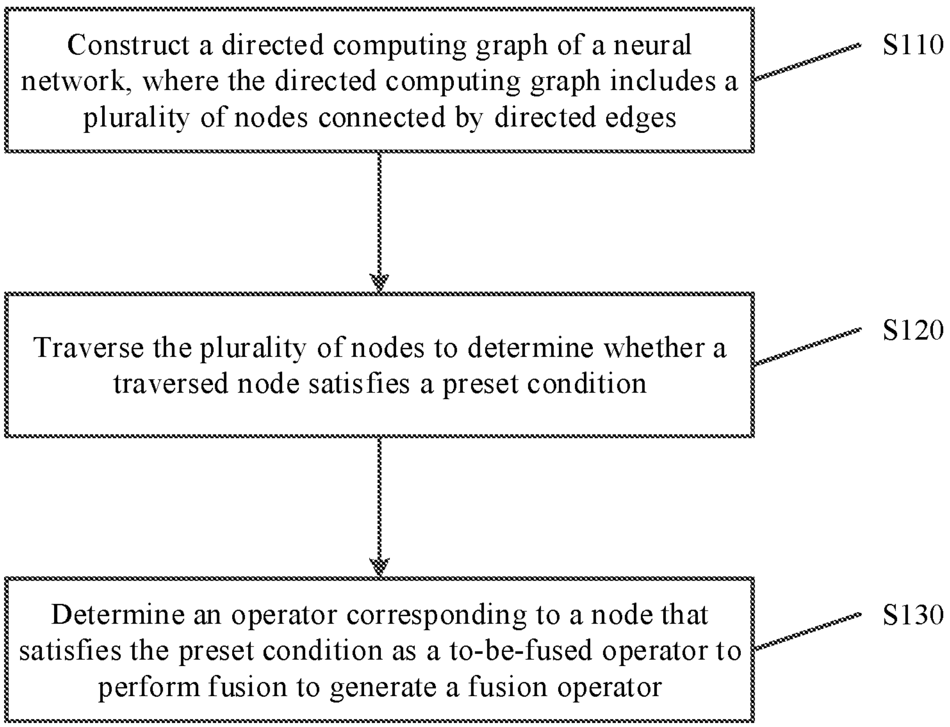
FIG. 1 is a flowchart of a method for fusing operators of a neural network according to an implementation of the present disclosure.

FIG. 1 is a flowchart of a method for fusing operators of a neural network according to an implementation of the present disclosure.

As shown in FIG. 1, the method of the present disclosure includes: in step S110, constructing a directed computing graph of the neural network, where the directed computing graph includes a plurality of nodes connected by directed edges: in step S120, traversing the plurality of nodes to determine whether a traversed node satisfies a preset condition; and in step S130, determining an operator corresponding to a node that satisfies the preset condition as a to-be-fused operator to perform fusion to generate a fusion operator.

To help better understand the technical solution of the present disclosure, some of the concepts and methods covered in the present disclosure are first introduced.

Figure 2:
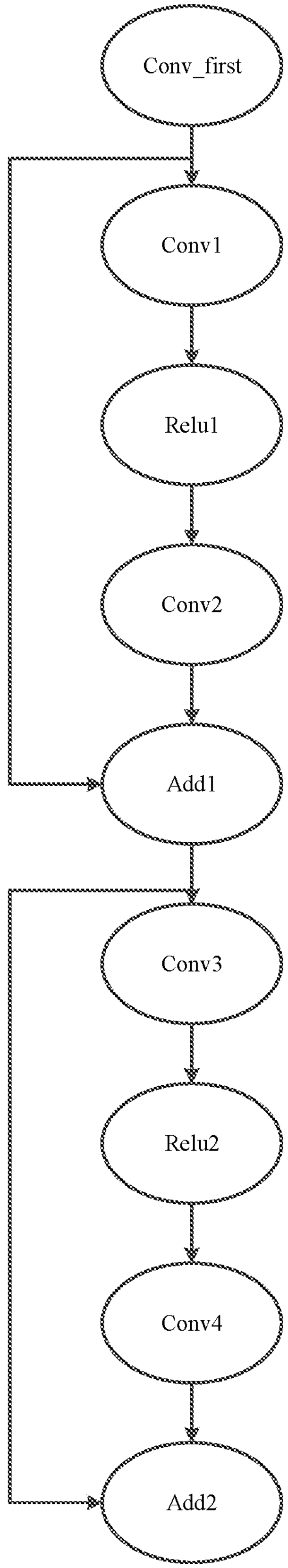
FIG. 2 is a schematic diagram of constructing a directed computing graph according to operators of a neural network according to an implementation of the present disclosure.

FIG. 2 is a schematic diagram of constructing a directed computing graph according to operators of a neural network according to an implementation of the present disclosure.

Taking TensorFlow as an example, a directed graph containing a set of nodes and edges is used to describe a computing process, and the directed graph may also be called a directed computing graph. In essence, the computing graph refers to a relationship between nodes and edges. The nodes may represent an input starting point of data, an output ending point of data, and a model parameter of data, and the like. The edges represent input/output relationships between nodes. There are two types of edges. One type is an edge that transfers concrete data, where the transferred data is a tensor. There is also a kind of edge that represents a control dependency relationship between nodes. This kind of edge does not transfer data, but only represents an order of execution between nodes, where when the former node completes computing, the later node may start computing.

The directed computing graph in FIG. 2 includes a plurality of operators, and each operator may be represented as a node in the directed computing graph, and nodes are connected by directed edges. For example, output nodes of a node Conv_first are Conv1 and Add1, an input node of the node Conv1 is Conv_first, an output node of the node Conv1 is Relu1, and input nodes of Add2 are nodes Conv4 and Add1. In the present disclosure, an input node may also be called a parent node. For example, parent nodes of Add2 are nodes Conv4 and Add1. Similarly, an input node of a node may be called a child node or a subordinate node. For example, a child node of Conv4 is Add2.

After the directed computing graph is constructed, each node in the computing graph may be traversed to determine characteristics of the node itself and a relationship between the node and other nodes, so as to determine whether a traversed node satisfies a preset condition for fusion. If the traversed node satisfies the preset condition, an operator corresponding to the node may be fused. It is required to be understood that in the present disclosure, terms operator and node are essentially the same. A node is just a symbolic representation of an operator, so the two may be used interchangeably.

According to an implementation of the present disclosure, in order to facilitate a fusion of operators, an optimization search sequence is created according to a plurality of nodes; and the plurality of nodes in the optimization search sequence are traversed to determine whether a traversed node satisfies a preset condition.

In judging whether an operator may be fused, nodes in FIG. 2 are required to be formed into an ordered rather than random queue, which is called an optimization search sequence in the present disclosure. In this sequence, the nodes are ordered according to a specific rule, and these ordered nodes may be traversed to find a node or operator that may be fused.

According to an implementation of the present disclosure, the directed computing graph may be traversed backwards to create the optimization search sequence. Creating the optimization search sequence according to the plurality of nodes includes: determining output edge counts in the directed edges of the nodes; and determining a node with 0 output edge as a candidate node and adding the node to a first queue to create the optimization search sequence. The backward traversal of the directed computing graph means starting from a final output node of the computing graph and traversing each node from downstream to upward.

FIG. 2 is still taken as an example for illustration. Nodes in FIG. 2, for example, are represented as a collection E0, which includes {add2, conv4, relu2, conv3, add1, conv2, relu1, conv1, conv_first}. According to the directed computing graph shown in FIG. 2, an output edge count of each node may be obtained. For example, an output edge count of a node Conv1 is 1, an output edge count of a node Add1 is 2, and an output edge count of a node add2 is 0, and the like. As such, output edge counts of the above nine nodes may be expressed as {0, 1, 1, 1, 2, 1, 1, 1, 2}. For a node with 0 output edge, its occupied space essentially depends on input data, so if a storage space occupied by an input node of the node with 0 output edge is not greater than a space occupied by the node with 0 output edge, then the two may be fused theoretically.

Therefore, in creating the optimization search sequence, the node with 0 output edge may be first used as an initial node to be added to the optimization search sequence, and which nodes that may be fused with the initial node in the collection E0 are searched step by step.

Figure 3:
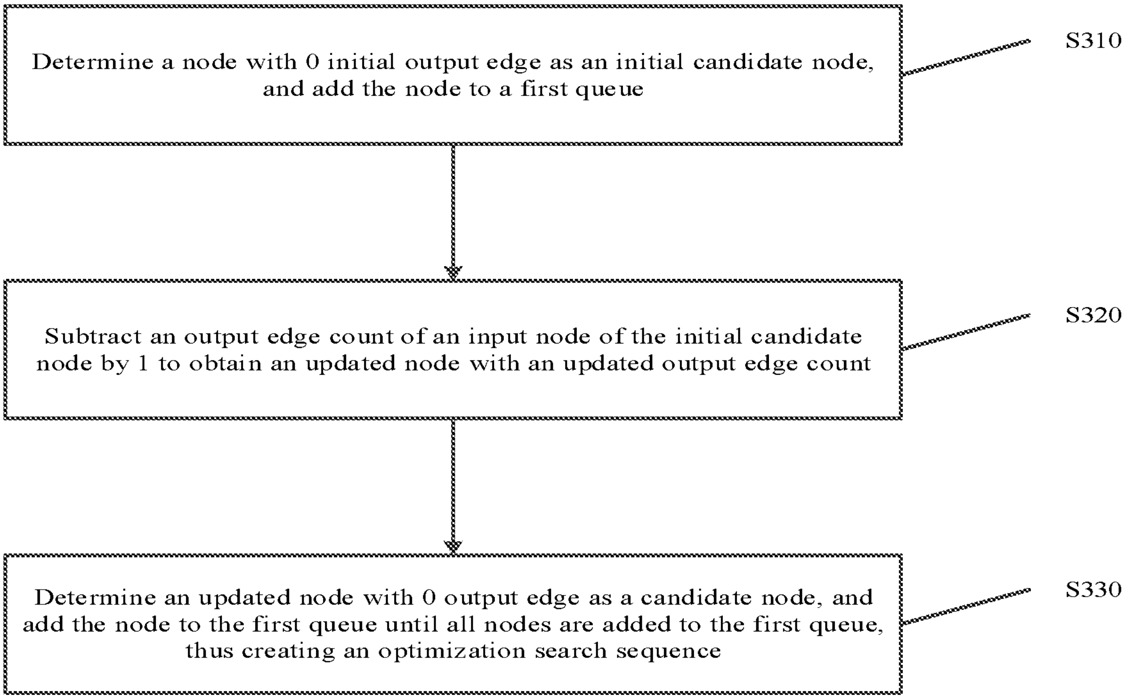
FIG. 3 is a flowchart of creating an optimization search sequence according to an implementation of the present disclosure.

FIG. 3 is a flowchart of creating an optimization search sequence according to an implementation of the present disclosure.

As shown in FIG. 3, determining a node with 0 output edge as a candidate node and adding the node to a first queue to create an optimization search sequence may include: in step S310, determining a node with 0 initial output edge as an initial candidate node, and adding the node to a first queue: in step S320, subtracting an output edge count of an input node of the initial candidate node by 1 to obtain an updated node with an updated output edge count; and in step S330, determining an updated node with 0 output edge as the candidate node, and adding the node to the first queue until all nodes are added to the first queue, thus creating the optimization search sequence.

It is assumed that the optimization search sequence is represented by a sequence Qi, where i is a serial number. As described above, the sequence Qi is initially empty and represented as Q0. Since an output edge count of a node Add2 is 0, the node Add2 may be first added to the sequence Q0, thus forming a sequence Q1={Add2}.

Next, the node Add2 may be deleted from the collection E0, so the collection E0 is updated as E1={conv4, relu2, conv3, add1, conv2, relu1, conv1, conv_first}. Output edge counts of input nodes of the initial node Add2 are subtracted by 1. The input nodes of the node Add2 are a node Add1 and a node Conv4, so output edge counts of these two nodes Add1 and Conv4 are subtracted by 1, and the output edge counts of the nodes Add1 and Conv4 are updated to 1 and 0, respectively. As such, output edge counts of all nodes in the collection E1 are {0, 1, 1, 1, 1, 1, 1, 2}, respectively.

At this time, an output edge count of the node Conv4 is 0, so the node Conv4 may be added to the sequence Q1, thus forming a sequence Q2={Add2, Conv4}.

Next, the node Conv4 may be deleted from the collection E1, so the collection E1 is updated as E2={relu2, conv3, add1, conv2, relu1, conv1, conv_first}. An output edge count of an input node of the node Conv4 is subtracted by 1. The input node of the node Conv4 is a node Relu2, so an output edge count of the node Relu2 is subtracted by 1. As such, output edge counts of all nodes in the collection E2 are {0, 1, 1, 1, 1, 1, 2}, respectively.

At this time, an output edge count of the node relu2 is 0, so the node relu2 may be added to the sequence Q2, thus forming a sequence Q3={Add2, Conv4, Relu2}.

Next, the node Relu2 may be deleted from the collection E2, so the collection E2 is updated as E3={conv3, add1, conv2, relu1, conv1, conv_first}. An output edge count of an input node of the node Relu2 is subtracted by 1. The input node of the node Relu2 is a node Conv3, so an output edge count of the node Conv3 is subtracted by 1. As such, output edge counts of all nodes in the collection E3 are {0, 1, 1, 1, 1, 2}, respectively.

At this time, an output edge count of the node Conv3 is 0, so the node Conv3 may be added to the sequence Q3, thus forming a sequence Q4={Add2, Conv4, Relu2, Conv3}.

In this way, all nodes in the directed computing graph may be added to the sequence Qi to form an optimization search sequence. It may be understood that the optimization search sequence is Q9={add2, conv4, relu2, conv3, add1, conv2, relu1, conv1, conv_first} finally.

The above is only an illustrative explanation in combination with FIG. 2. For neural networks with different structures, different optimization search sequences may be formed. In this way, each node may be ordered to judge whether the node is a node that may be fused in the following operation.

Figure 4:
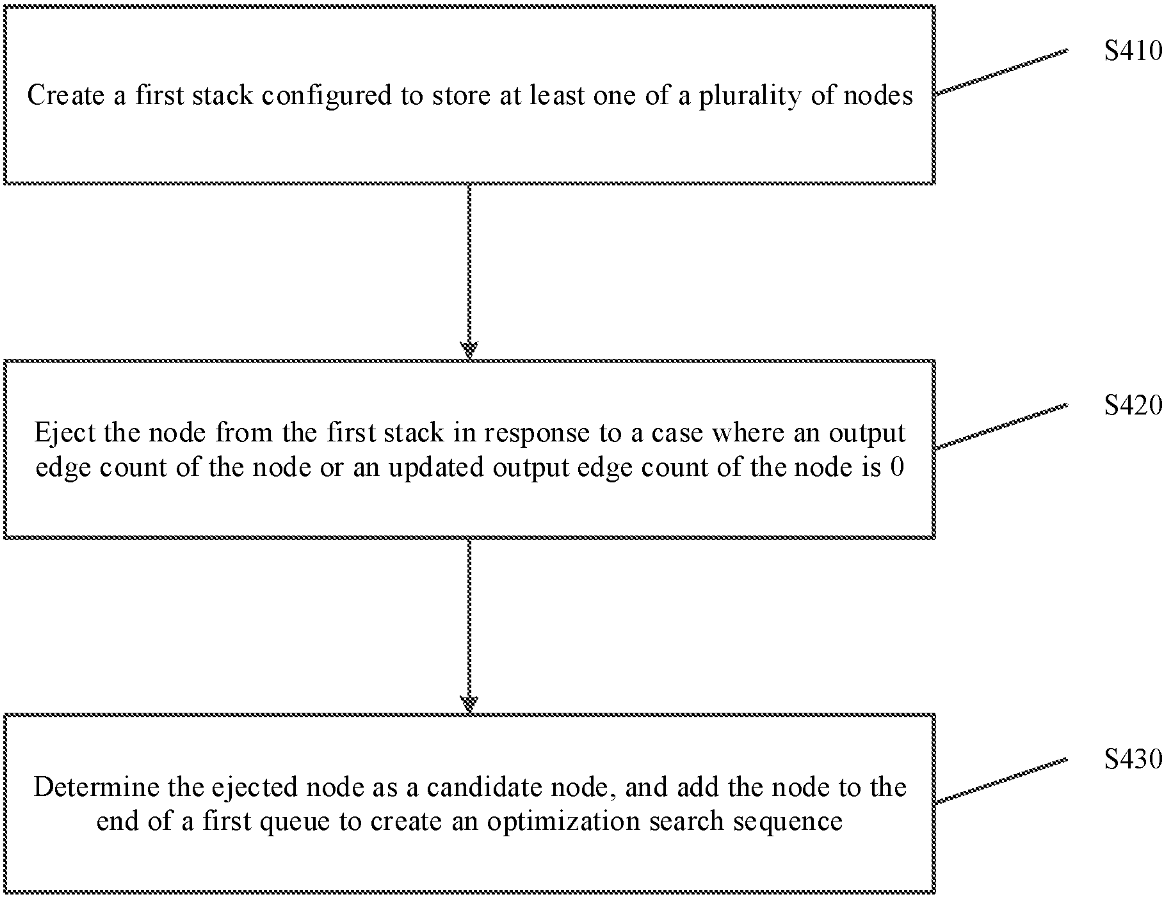
FIG. 4 is a flowchart diagram of determining a node with 0 output edge as a candidate node and adding the node to a first queue to create an optimization search sequence according to an implementation of the present disclosure.

FIG. 4 is a flowchart diagram of determining a node with 0 output edge as a candidate node and adding the node to a first queue to create an optimization search sequence according to an implementation of the present disclosure. According to an implementation of the present disclosure, determining the node with 0 output edge as the candidate node and adding the node to the first queue to create the optimization search sequence may further include: in step S410, creating a first stack configured to store at least one of a plurality of nodes: in step S420, ejecting the node from the first stack in response to a case where an output edge count of the node or an updated output edge count of the node is 0; and in step S430, determining the ejected node as the candidate node, and adding the node to the end of the first queue to create the optimization search sequence.

The directed computing graph shown in FIG. 2 is still taken as an example. A stack may be created, and a node is put into this stack: if an output edge count (including an updated output edge count) of the node is 0, the node with 0 output edge is ejected from the stack to the end of the optimization search sequence described above, thus gradually forming a complete optimization search sequence.

For example, a node Add2 is first stacked, followed by a node Conv4, a node Relu2, a node Conv3, and so on. Thus, when an output edge count of a certain node is 0, or when an output edge count of a certain node is updated to 0, the node is ejected from the stack. It is required to be understood that creating a stack is just a convenient way, and it is not necessarily required to create a stack.

After all nodes are set to the optimization search sequence in order according to the above method, a next step is to determine which nodes in the optimization search sequence may be fused.

Figure 5:
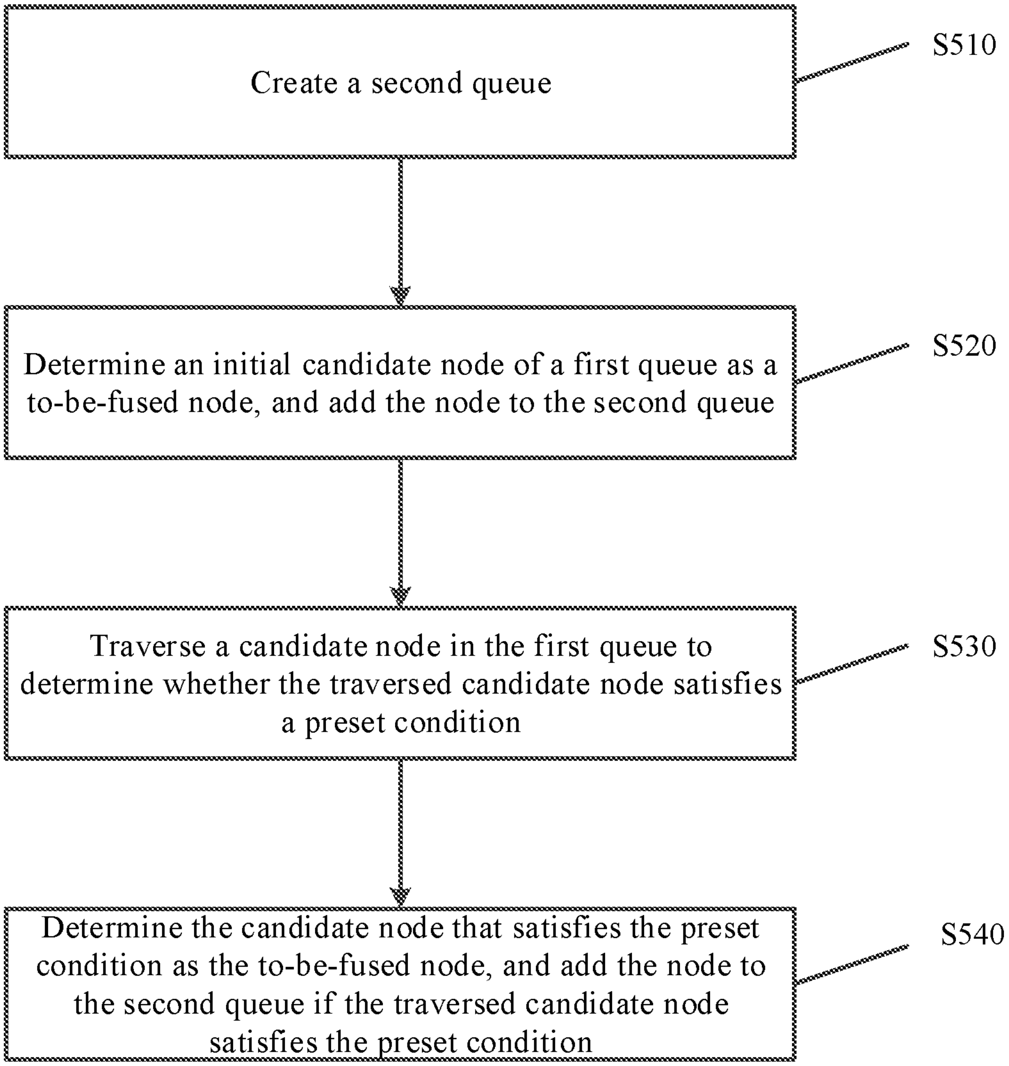
FIG. 5 is a flowchart of a method for traversing a plurality of nodes to determine whether a traversed node satisfies a preset condition according to an implementation of the present disclosure.

FIG. 5 is a flowchart of a method for traversing a plurality of nodes to determine whether a traversed node satisfies a preset condition according to an implementation of the present disclosure.

As shown in FIG. 5, the method includes: in step S510, creating a second queue: in step S520, determining an initial candidate node of a first queue as a to-be-fused node, and adding the node to the second queue: in step S530, traversing a candidate node in the first queue to determine whether the traversed candidate node satisfies a preset condition; and in step S540, determining the candidate node that satisfies the preset condition as the to-be-fused node, and adding the node to the second queue if the traversed candidate node satisfies the preset condition.

First, an empty second queue may be created. Then, a first node (such as a node Add2) in an optimization search sequence may be added to the second queue as a first to-be-fused node.

Next, starting from a second node of the optimization search sequence (the first queue), all nodes are traversed, and whether the traversed node satisfies the preset condition is determined. If the traversed node satisfies the preset condition, the traversed node is added to the second queue, so that the node may be fused with the first node in the second queue. However, if the traversed node does not satisfy the preset condition, then the traversed node is unable to be fused with the node in the second queue.

It is required to be understood that creating a second queue is only a more intuitive way, and it is not necessary to create a second queue to accommodate nodes that may be fused.

Next, multiple scenarios of the above preset condition will be described in detail.

According to an implementation of the present disclosure, if a first storage space occupied by the traversed candidate node is less than or equal to a second storage space occupied by a child candidate node of the candidate node, the traversed candidate node satisfies the preset condition.

An optimization search sequence Q9={add2, conv4, relu2, conv3, add1, conv2, relu1, conv1, conv_first} is stilled taken as an example for explanation.

First, a node add2 is added to a second queue. Next, starting from a node conv4, all other nodes are traversed. The node add2 is an adding node, and a size of output data of the node is usually not larger than a size of input data of the node.

Then, the node conv4 is traversed. The node conv4 is a convolution operation node. According to characteristics of a convolution operation, a size of output data of the convolution operation node conv4 is usually larger than a size of input data of the convolution operation node conv4. Therefore, a size of a storage space required to be occupied by the node conv4 should not be smaller than a size of a storage space occupied by the output data of the node conv4. It may be contemplated that in this situation, the size of the storage space occupied by the node conv4 is not larger than (is smaller than or equal to) a size of a storage space occupied by a child node add2 of the node conv4. Therefore, the node conv4 may be added to the second queue to be fused with the node add2.

Then, a node relu2 is traversed. The node relu2 is an in place operation node. The in place operation means that an operation takes place at an original storage location of data involved in the operation. Such an operation may not cause data to swell or shrink. Therefore, a size of a storage space occupied by the node relu2 is not larger than (is smaller than or equal to) a size of a storage space occupied by a child node conv4 of the node relu2. Therefore, the node relu2 may be added to the second queue to be fused with the nodes add2 and conv4.

Next, a node conv3 is traversed. The node conv3 is a convolution operation node. According to characteristics of a convolution operation, a size of output data of the convolution operation node conv3 is usually larger than a size of input data of the convolution operation node conv3. Therefore, a size of a storage space required to be occupied by the node conv3 should not be smaller than a size of a storage space occupied by output data of the node conv3. It may be contemplated that in this situation, the size of the storage space occupied by the node conv3 is not larger than (is smaller than or equal to) a size of a storage space occupied by a child node relu2 of the node conv3. Therefore, the node conv3 may be added to the second queue to be fused with the nodes add2, conv4, and relu2.

Next, a node add1 is traversed. The node add1 is an adding node. As shown in FIG. 2, inputs of the node add 1 include an output of a node conv2 and an output of a node conv_first. Therefore, a space occupied by the node add1 is the largest between a sum of a storage space occupied by output data of the node conv2 and a storage space occupied by output data of the node conv_first and a storage space occupied by output data of the node add1. Usually, the sum of the storage space occupied by the output data of the node conv2 and the storage space occupied by the output data of the node conv_first is larger than the storage space occupied by the output data of the node add1, so the storage space occupied by the node add1 exceeds a storage space occupied by a child node conv1 of the node add1. Therefore, the node add1 may not be fused with the nodes add2, conv4, relu2, and conv3.

It is required to be understood that a storage space occupied by each node may be evaluated according to characteristics of each node or may be determined according to a storage space occupied by each node in actual operation.

According to the above principles, the nodes add1, conv2, relu1, and conv1 may also be determined as nodes that may be fused, which will not be described herein.

In the above, the storage space occupied by each node is used as a standard to determine whether the node may be fused, which is a basic judgment standard. According to another implementation of the present disclosure, if a traversed candidate node is an input node of a to-be-fused node in a second queue and the traversed candidate node is an in place operation node, it is determined that the first storage space is smaller than or equal to the second storage space.

A simpler and more straightforward way may be used to judge whether a node may be fused with a node in the second queue. In this implementation, if the traversed node is an input node of a certain node in the second queue and the traversed node is an in place operation node, it may be directly judged that this traversed node satisfies a preset condition. This is because a storage space occupied by output data of an in place operation node is not larger than a storage space occupied by input data of the in place operation node, so a storage space occupied by the in place operation node is not larger than a storage space occupied by a child node of the in place operation node.

Whether the traversed node satisfies the preset condition may also be determined in the following way. According to an implementation of the present disclosure, if a traversed candidate node is an input node of a to-be-fused node in a second queue and the traversed candidate node is a non-in-place operation node, but all to-be-fused nodes in the second queue are in place operation nodes, it is determined that the first storage space is smaller than or equal to the second storage space.

In this implementation, when a node in an optimization search sequence is traversed, if this node is not an in place operation node, it may be first determined whether a child node of this node has been added to to-be-fused nodes in the second queue and whether all nodes in the second queue are in place operation nodes. If this condition is satisfied, it means that all nodes after the traversed node do not occupy more storage space, so that the traversed node may be fused with all in place operation nodes in the second queue.

In the above implementations, whether a node may be fused is determined by judging a storage space occupied by the node. According to another implementation of the present disclosure, whether the node may be fused may also be judged based on running time of each operator (node).

According to an implementation of the present disclosure, if fusion running time after the traversed candidate node is fused with the to-be-fused node in the second queue is less than or equal to first running time, the traversed candidate node satisfies the preset condition, where the first running time is running time when the traversed candidate node is not fused with the to-be-fused node in the second queue.

The directed computing graph shown in FIG. 2 is still taken as an example to explain the above implementation.

First, a node add2 is added to a second queue. Next, starting from a node conv4, nodes in an optimization search queue are traversed.

It may be contemplated that the node conv4 is a parent node of the node add2. After testing, it is obtained that running time of the nodes add2 and conv4 is 5 ms, while running time after the nodes add2 and conv4 are fused is 3 ms, and the time is reduced after fusion, so the two nodes may be fused. Then, this process continues to traverse a node relu2 backwards.

The node relu2 is a parent node of the node conv4, so the node relu2 may be fused with the nodes add2 and conv4. Then, this process continues to traverse a node conv3 backwards.

The node conv3 is a parent node of the node relu2. After testing, it is obtained that running time of the nodes add2, conv4, and relu2 after fusion and the node conv3 is 6 ms, while running time after the nodes add2, conv4, relu2, and conv3 are fused is 5 ms, and the time is reduced after fusion, so the nodes add2, conv4, relu2, and conv3 may be fused. Then, this process continues to traverse a node add1 backwards.

The node add1 is a parent node of the nodes add2 and conv3. After testing, it is obtained that running time of the nodes add2, conv4, relu2, and conv3 after fusion and the node add1 is 6 ms, while running time after the nodes add2, conv4, relu2, conv3, and add1 are fused is 7 ms, and the time is increased after fusion, so the node add1 may not be fused with the nodes add2, conv4, relu2, and conv3.

In the above, only independent running time of nodes and running time after nodes are fused are concerned. According to another implementation of the present disclosure, whether a node may be fused may be judged by considering both a storage space occupied by the node and running time of the node.

Figure 6:
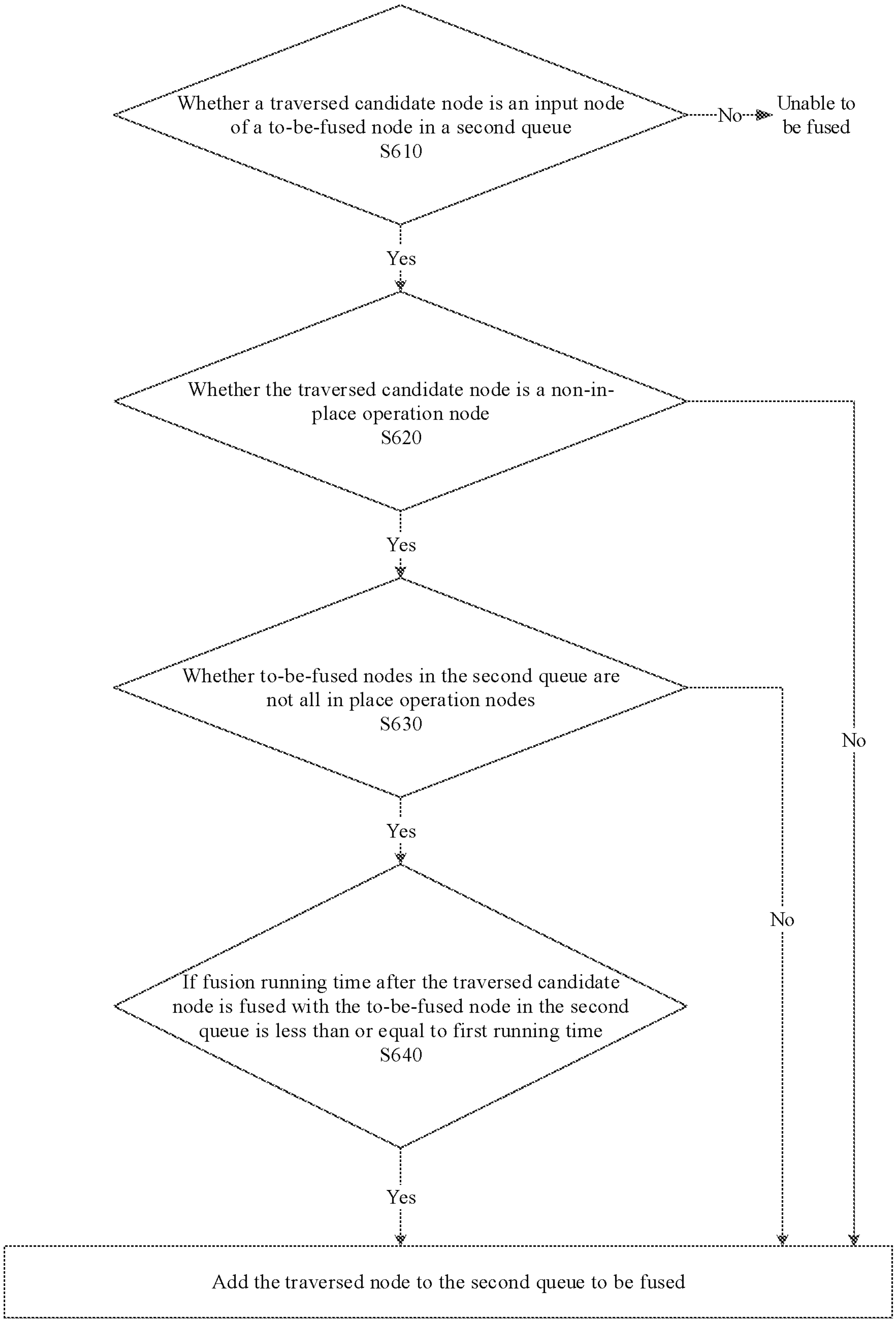
FIG. 6 is a flowchart of a method for judging whether a candidate node satisfies a preset condition according to an implementation of the present disclosure.

FIG. 6 is a flowchart of a method for judging whether a candidate node satisfies a preset condition according to an implementation of the present disclosure.

As shown in FIG. 6, in an operation S610, whether a traversed candidate node is an input node of a to-be-fused node in a second queue is judged: if the traversed candidate node is the input node of the to-be-fused node in the second queue, an operation S620 is performed: if the traversed candidate node is not the input node of the to-be-fused node in the second queue, this node is unable to be fused with the node in the second queue.

Next, in the operation S620, whether the traversed candidate node is a non-in-place operation node is judged: if the traversed candidate node is the non-in-place operation node, an operation S630 is performed: if the traversed candidate node is not the non-in-place operation node, which means that the traversed candidate node is an in place operation node, this in place operation node is added to the second queue to be fused.

Next, in the operation S630, whether to-be-fused nodes in the second queue are not all in place operation nodes is judged: if the to-be-fused nodes in the second queue are not all in place operation nodes, an operation S640 is performed: if the to-be-fused nodes in the second queue are all in place operation nodes, the traversed node is added to the second queue to be fused.

Next, in the operation S640, if fusion running time after the traversed candidate node is fused with the to-be-fused node in the second queue is less than or equal to first running time, the traversed candidate node satisfies the preset condition, where the first running time is running time when the traversed candidate node is not fused with the to-be-fused node in the second queue. In this situation, the traversed node is added to the second queue to be fused.

Next, the directed computing graph shown in FIG. 2 is still taken as an example to explain the implementation shown in FIG. 6.

First, a node add2 is added to a second queue. Next, starting from a node conv4, nodes in an optimization search queue are traversed.

It may be contemplated that the node conv4 is a parent node of the node add2 (a traversed candidate node is an input node of a to-be-fused node in the second queue), the nodes conv4 and add2 are not in place operation nodes (the traversed candidate node is a non-in-place operation node), and a node added to the second queue (the node add2) is not an in place operation node (which means that to-be-fused nodes in the second queue are not all in place operation nodes). After testing, it is obtained that running time of the nodes add2 and conv4 is 5 ms, while running completion time after the nodes add2 and conv4 are fused is 3 ms, and the time is reduced after fusion, so the two nodes may be fused. Then, this process continues to traverse a node relu2 backwards.

The node relu2 is a parent node of the node conv4, and the node relu2 is an in place operation node, so the node relu2 may be fused with the nodes add2 and conv4. Then, this process continues to traverse a node conv3 backwards.

The node conv3 is a parent node of the node relu2. The nodes conv3 and conv4 are not in place operation nodes. Moreover, not all nodes in the second queue are in place operation nodes. After testing, it is obtained that running time of the nodes add2, conv4, and relu2 after fusion and the node conv3 is 6 ms, while running completion time after the nodes add2, conv4, relu2, and conv3 are fused is 5 ms, and the time is reduced after fusion, so the nodes add2, conv4, relu2, and conv3 may be fused. Then, this process continues to traverse a node add 1 backwards.

The node add1 is a parent node of the nodes add2 and conv3. The nodes add1 and conv3 are not in place operation nodes. Moreover, not all nodes in the second queue are in place operation nodes. After testing, it is obtained that running time of the nodes add2, conv4, relu2, and conv3 after fusion and the node add1 is 6 ms, while running completion time after the nodes add2, conv4, relu2, conv3, and add1 are fused is 7 ms, and the time is increased after fusion, so the node add1 may not be fused with the nodes add2, conv4, relu2, and conv3.

It is required to be understood that operation time of a node may be obtained by actual measurement or may be estimated by establishing an operation model of an operator. In this field, any known or unknown method may be used to obtain operation time of an operator (node).

It is also required to be understood that for the operations S610-S630, although the preceding sequence is shown above, such judgment operations do not necessarily follow the sequence shown in FIG. 6. Instead, the operations S610-S630 may be performed in any sequence.

Figure 7A:
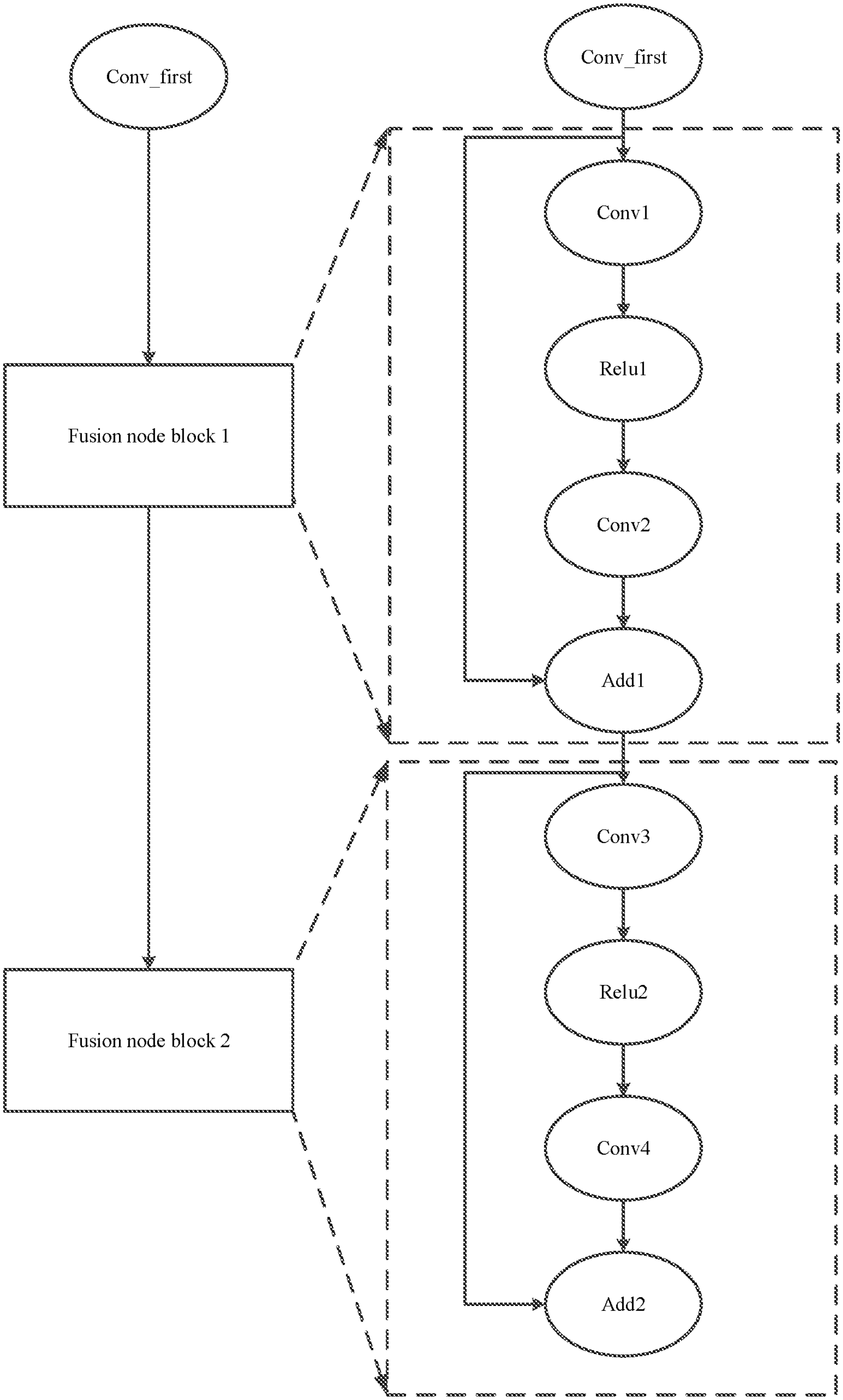
FIG. 7A and FIG. 7B are schematic diagrams of fusing nodes (operators) according to an implementation of the present disclosure.
Figure 7B:
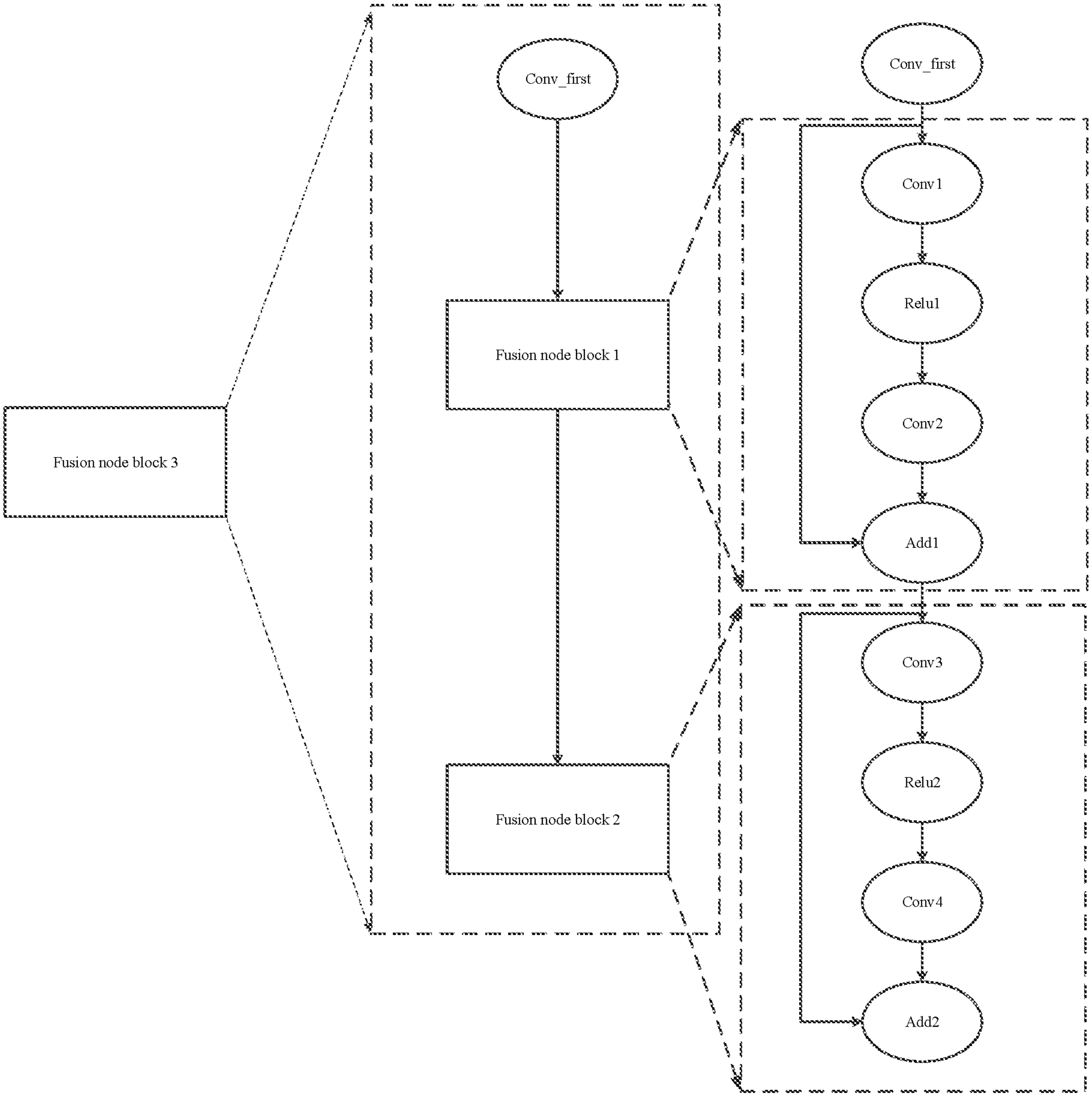

FIG. 7A and FIG. 7B are schematic diagrams of fusing nodes (operators) according to an implementation of the present disclosure.

As shown in FIG. 7A, after nodes (operators) are fused, the nodes may be replaced by a new node. For example, nodes that may be fused, including add2, conv4, relu2, and conv3, may be replaced by a fusion node block 1, and nodes that may be fused, including conv1, relu2, conv2, and add1, may be replaced by a fusion node block 2. Thus, after the fusion of the nodes, a neural network shown in FIG. 2 becomes a neural network shown in FIG. 7A, where the neural network includes a node conv_first, the fusion node block 1, and the fusion node block 2.

Further, as shown in FIG. 7B, fused nodes and node blocks may be further fused. Assuming that the node conv_first, the fusion node block 1, and the fusion node block 2 are also nodes (node blocks) that may be fused, whether these nodes may be fused may also be determined based on the above rule. In the case that these nodes (node blocks) may be fused, these nodes may be fused into a fusion node block 3.

The above describes a method for judging nodes that may be fused and corresponding operations. For large tensor data, how to efficiently split the data to match fused nodes is also a problem worth paying attention to.

Figure 8:
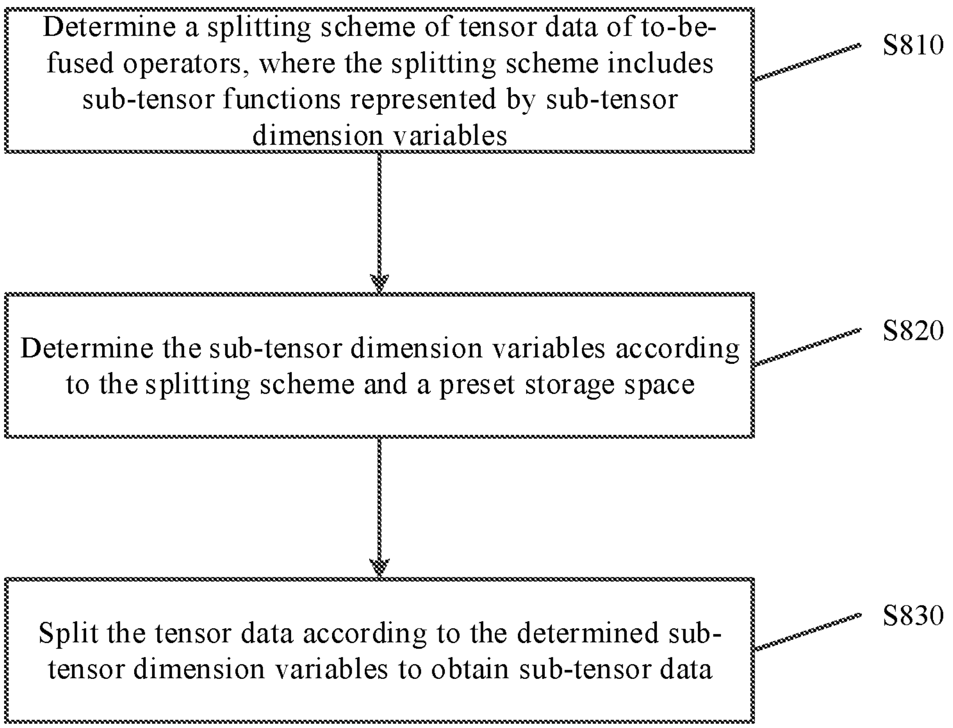
FIG. 8 is an exemplary flowchart of splitting tensor data according to an implementation of the present disclosure.

FIG. 8 is an exemplary flowchart of splitting tensor data according to an implementation of the present disclosure.

As shown in FIG. 8, the method of the present disclosure may be individually or further include: in an operation S810, determining a splitting scheme of tensor data of to-be-fused operators, where the splitting scheme includes sub-tensor functions represented by sub-tensor dimension variables: in an operation S820, determining the sub-tensor dimension variables according to the splitting scheme and a preset storage space; and in an operation S830, splitting the tensor data according to the determined sub-tensor dimension variables to obtain sub-tensor data.

In the above, "sub-tensor" refers to a sub-tensor formed after tensor data is split, such as a small picture formed after a picture is split. The sub-tensor dimension variables refer to various variables that represent dimensions of this sub-tensor. Through these variables, sub-tensor functions may be formed.

It is required to be understood that the above operations may exist independently, which means that the above operations may not rely on the fusion of nodes described above, but simply split the tensor data, and the above operations may also reply on the fusion of nodes described above.

It may be understood that the tensor data may be represented in multiple dimensions. For example, a shape of a piece of tensor data is (720, 1080, 3), which represents that a height h of this piece of tensor data is 720, a width w of this piece of tensor data is 1080, and a channel count c of this piece of tensor data is 3. The channel count of the tensor data usually does not change depending on different operators, so the channel count c may be viewed as a constant. For the height h and width w of the tensor data, data for each operator may be different, so for each operator, the height h and width w may be viewed as variables.

Therefore, input data and output data of each operator may be represented by functions of h and w. A storage space occupied by each operator may also be represented by variables h and w. For a plurality of operators that may be fused, since a function of each operator may be different, but a maximum storage space occupied by each operator is a constant value, thus, specific variables h and w are required to be determined according to a splitting scheme of tensor data of each operator and a size of a preset storage space. After the h and w are determined, the tensor data may be split. The preset storage space may be an on-chip storage space of hardware.

Figure 9:
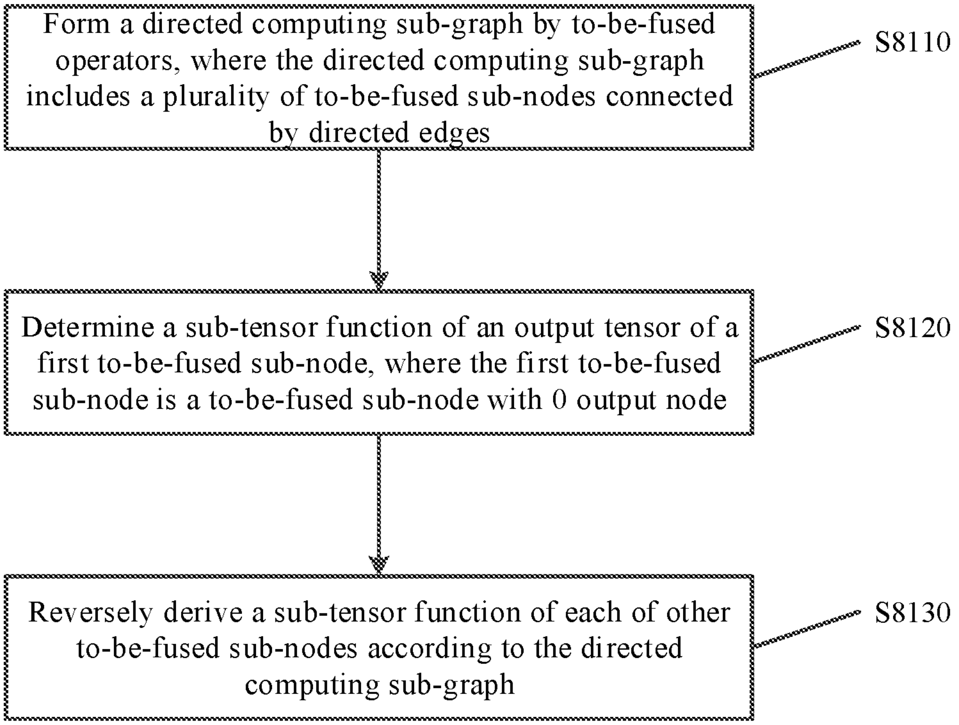
FIG. 9 is a flowchart of a method for determining a splitting scheme of tensor data of to-be-fused operators according to an implementation of the present disclosure.

FIG. 9 is a flowchart of a method for determining a splitting scheme of tensor data of to-be-fused operators according to an implementation of the present disclosure.

As shown in FIG. 9, determining the splitting scheme of the tensor data of the to-be-fused operators may include: in an operation S8110, forming a directed computing sub-graph by to-be-fused operators in a second queue, where the directed computing sub-graph includes a plurality of to-be-fused sub-nodes connected by directed edges: in an operation S8120, determining a sub-tensor function of an output tensor of a first to-be-fused sub-node, where the first to-be-fused sub-node is a to-be-fused sub-node with 0 output node; and in an operation S8130, reversely deriving a sub-tensor function of each of other to-be-fused sub-nodes according to the directed computing sub-graph.

For the operation S8110, only operators that are required to be fused are formed into the directed computing sub-graph, which is the same as the way of forming the directed computing graph introduced in combination with FIG. 2 above. Therefore, related descriptions will not be repeated herein.

Next, the sub-tensor function of the output tensor of the first to-be-fused sub-node is determined. Taking to-be-fused sub-operators (nodes) add2, conv4, relu2, and conv3 as examples, a sub-tensor function of an output tensor of the node add2 (an output node count of this node is 0) may be first determined, such as F(h, w, 32).

After the sub-tensor function of the first to-be-fused sub-node is determined, according to each operator, a sub-tensor function of input data of the operator may be reversely derived in a depth-first manner. For example, a sub-tensor function of input data of the node add2 may be derived as (F(h, w, 32), F(h, w, 32)): a sub-tensor function of input data of the node conv4 may be derived as (h+2, w+2, 32): a sub-tensor function of input data of the node relu2 may be derived as F(h+2, w+2, 32); and a sub-tensor function of input data of the node conv3 may be derived as F(h+4, w+4, 32). Therefore, shapes of tensors of input and output data of all nodes may be expressions based on variables h and W:

It is required to be understood that in the context, a symbol "F" is used to represent various kinds of sub-tensor functions. However, the function symbol F is merely a general term for functions, and does not mean that every function must be the same.

In a specific implementation, reversely deriving the sub-tensor function of each of other to-be-fused sub-node according to the directed computing sub-graph may include: when the to-be-fused sub-node has a plurality of outputs, reversely deriving a maximum sub-tensor function of each of other to-be-fused sub-nodes.

A node may have a plurality of outputs. In this situation, rather than simply reversely deriving the input according to a certain output in a depth-first manner, the maximum sub-tensor function of the to-be-fused node should be reversely derived according to the plurality of outputs, and then, maximum tensor functions of all other to-be-fused nodes are derived. Determining the maximum tensor functions will help to obtain a maximum storage space occupied by each node.

Figure 10:
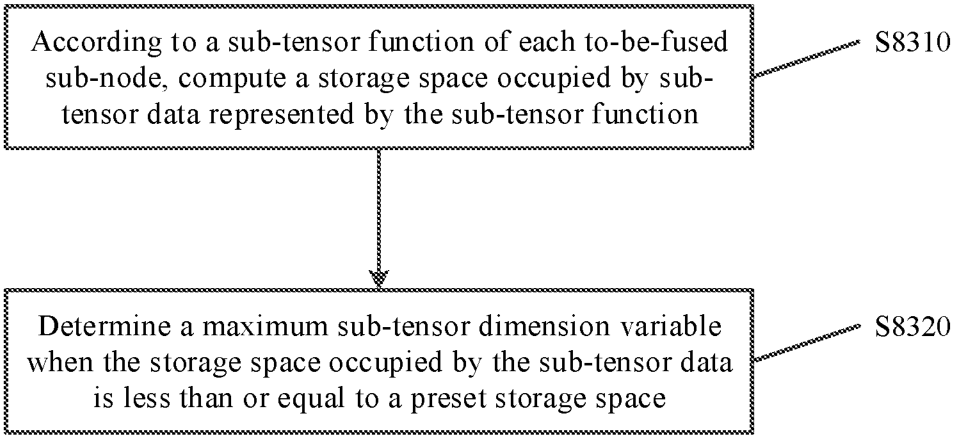
FIG. 10 is a flowchart of a method for determining sub-tensor dimension variables according to a splitting scheme and a preset storage space according to an implementation of the present disclosure.

FIG. 10 is a flowchart of a method for determining sub-tensor dimension variables according to a splitting scheme and a preset storage space according to an implementation of the present disclosure.

As shown in FIG. 10, determining the sub-tensor dimension variables according to the splitting scheme and the preset storage space may include: in an operation S8310, according to a sub-tensor function of each to-be-fused sub-node, computing a storage space occupied by sub-tensor data represented by the sub-tensor function: in an operation S8320, determining a maximum sub-tensor dimension variable when the storage space occupied by the sub-tensor data is less than or equal to the preset storage space, where the sub-tensor data represented by the sub-tensor function includes: output sub-tensor data of the to-be-fused sub-node, intermediate sub-tensor data generated when the to-be-fused sub-node is running, and input sub-tensor data of the to-be-fused sub-node.

After a sub-tensor function of each to-be-fused sub-node is determined, a storage space occupied by data represented by the sub-tensor function may be determined. For example, a sub-tensor function of output data of a node add2 is (h, w, 32), so a storage space occupied by the output data may be represented as h*w*32. It is required to be understood that an expression for computing a storage space here is merely an illustrative representation, which is not necessarily the same as the way of actual computing of the occupied storage space. For example, this expression may omit some constants, and so on. For example, a size of each pixel is 2 bytes, so the storage space occupied by the output data of the node add2 may be actually expressed as h*w*32*2B. Here, a constant 2B is omitted for the sake of description.

After each sub-tensor function is acquired, an optimal value for each variable in the sub-tensor function may be determined by sizes of the sub-tensor function and the storage space. Given the use of storage space by some temporary scalars and function call stacks, it is possible to start to traverse w from a certain value. Here, the traversal starts with 1. For each w, a maximum h that satisfies h*w*32<=preset storage space may be found until there is no h that satisfies the constraint, and the traversal stops. In actual, a (h, w) with minimal actual test running time may be selected.

It is required to be understood that the sub-tensor functions above includes not only a sub-tensor function of output data of a certain node, but also a sub-tensor function of input data of that node and a sub-tensor function of intermediate data generated during operation. In order to facilitate understanding, the present disclosure mainly describes the sub-tensor function of the output data and the sub-tensor function of the input data by example.

According to an implementation of the present disclosure, determining the corresponding maximum sub-tensor dimension variable when the storage space occupied by the sub-tensor data is less than or equal to the preset storage space may include: determining a maximum storage space occupied by the output sub-tensor data, the intermediate sub-tensor data, and the input sub-tensor data; and when the maximum storage space is not greater than the preset storage space, determining a tensor dimension variable of sub-tensor data corresponding to the maximum storage space as the maximum sub-tensor dimension variable.

Further, in order to compute a maximum storage space occupied by a certain node, a maximum storage space occupied by all input data, output data, and intermediate data of the node is required to be computed.

Here, assuming that a maximum storage space required to be occupied by a certain node is m, a storage space occupied by output data of a node add2 is h*w*32; the node add2 is connected to two nodes, including a node conv4 and a node conv3 respectively, and maximum storage spaces occupied by these two nodes are represented as $m_{conv4}$ and $m_{conv3}$ respectively, so a maximum storage space occupied by the node add2 is madd2=max $\{m_{conv4}+m_{conv3}, h*w*32\}$.

It is assumed that an input and output channel count for all convolution operators is 32, a size of a convolution kernel is (3, 3), and the height and width are filled as (1, 1). According to a mathematical definition of convolution, a sub-tensor function of a piece of input data of the node add2 is F(h+2, w+2, 32). Accordingly, a sub-tensor function of output data of the node conv4 is F(h+2, w+2, 32), so a storage space occupied by output data of the node conv4 is F((h+2)*(w+2)*32); a storage space occupied by input data of the node conv4 is represented as $m_{relu2}$, so a maximum storage space occupied by the node conv4 is $m_{conv4}$=max$\{m_{relu2}, (h+2)*(w+2)*32\}$.

A sub-tensor function of input data of the node conv4 is (h+2, w+2, 32). Accordingly, a sub-tensor function of output data of the node relu2 is (h+2, w+2, 32), so a storage space occupied by the output data of the node relu2 is (h+2)*(w+2)*32; a storage space occupied by input data of the node relu2 is represented as $m_{conv3}$, so a maximum storage space occupied by the node relu2 is $m_{relu2}$-max $\{m_{conv3}, (h+2)*(w+2)*32\}$.

A sub-tensor function of output data of the node conv3 is F(h+4, w+4, 32). Therefore, a storage space occupied by the output data of the node conv3 is (h+4)*(w+4)*32; a storage space occupied by input data of the node conv3 is represented as madd1, so a maximum storage space occupied by the node conv3 is $m_{conv3}$-max $\{$madd1, (h+4)*(w+4)*32$\}$.

In this way, maximum storage spaces occupied by all nodes may be obtained.

For to-be-fused operators (nodes), it is expected that storage spaces occupied by all nodes are not greater than a preset storage space. A maximum sub-tensor function may be selected, so that a storage space corresponding to the sub-tensor function is not greater than the preset storage space. Thus, with the method described above, optimal values of h and w may be traversed.

According to an implementation of the present disclosure, when a to-be-fused sub-node has a plurality of inputs, a maximum storage space occupied by a sum of the output sub-tensor data, the intermediate sub-tensor data, and a plurality of pieces of input sub-tensor data is determined.

As shown in the above, input data of the node add2 includes output data from the node conv4 and output data from the node add1, so in the technical solution of the present disclosure, a total space occupied by a sum of a plurality of pieces of input sub-tensor data as input data is required to be computed, such as a formula $m_{add2}$=max $\{m_{conv4}+m_{add1}, h*w*32\}$ shown above.

Figure 11:
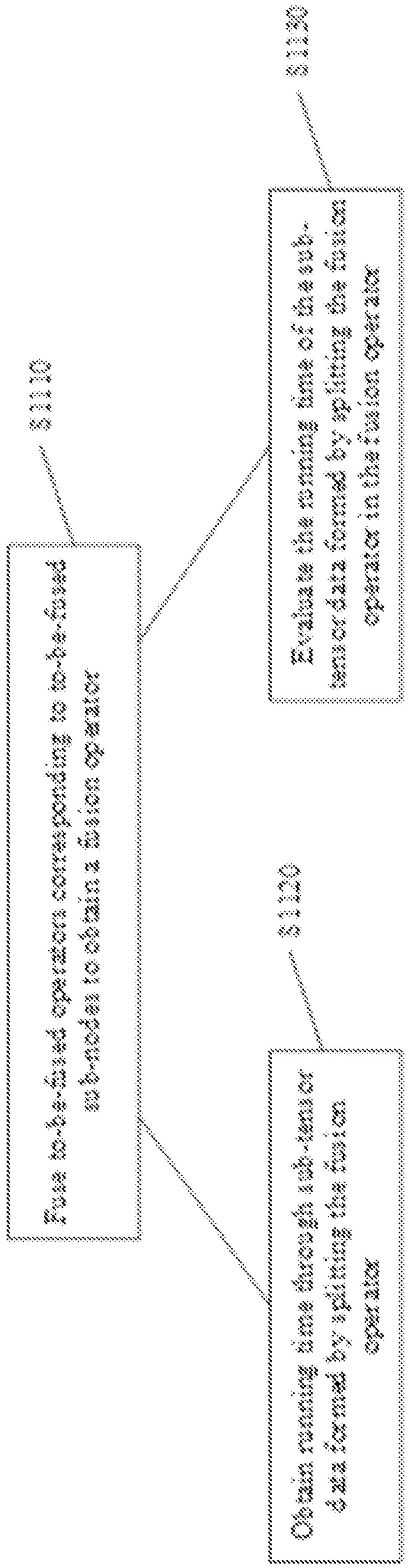
FIG. 11 is a flowchart of a method for fusing operators of a neural network according to an implementation of the present disclosure.

FIG. 11 is a flowchart of a method for fusing operators of a neural network according to an implementation of the present disclosure.

As shown in FIG. 11, after operators (nodes) that may be fused are determined and a splitting scheme of tensor data is determined, according to an implementation of the present disclosure, the method further includes: in an operation S1110, fusing to-be-fused operators corresponding to to-be-fused sub-nodes to obtain a fusion operator; and in an operation S1120, obtaining running time through sub-tensor data formed by splitting the fusion operator: or in an operation S1130, evaluating the running time of the sub-tensor data formed by splitting the fusion operator in the fusion operator.

For the operation S1110, referring to FIG. 7A and FIG. 7B, after nodes (operators) are fused, the nodes (operators) may be replaced by a new node (which is a fusion node or fusion operator). For example, nodes that may be fused, including add2, conv4, relu2, and conv3, may be replaced by a fusion node block 1, and nodes that may be fused, including conv1, relu2, conv2, and add1, may be replaced by a fusion node block 2. Thus, after the fusion of the nodes, a neural network shown in FIG. 2 becomes a neural network shown in FIG. 7A, where the neural network includes a node conv_first, the fusion node block 1, and the fusion node block 2.

After fusion, split data may be actually run, so that actual running time of the split data may be obtained, which is convenient to evaluate splitting effect of data or fusion effect of neural network operators. In another implementation, instead of the actual operation of the neural network, the running time of the split data in the fusion operator may be estimated through a neural network model.

In another implementation of the present disclosure, after the splitting scheme of the tensor data is determined, the split tensor data may be run in a neural network where operators are fused and a neural network where operators are not fused to compare performance difference between operator fusion and unfusion.

An optimization search sequence Q9={add2, conv4, relu2, conv3, add1, conv2, relu1, conv1, conv_first} is stilled taken as an example for explanation. For example, the nodes add2 and conv4 may be fused, the nodes add2, conv4, and relu2 may be fused, the nodes add2, conv4, relu2, and conv3 may be fused, and the nodes add2, conv4, relu2, conv3, and add1 may be fused, so as to evaluate running time of specific sub-tensors in each fusion scheme, thus obtaining an optimal fusion scheme. Further, the running time of specific sub-tensors in each fusion scheme may be used to determine running time after a candidate node is fused with operators in the second queue, so as to determine whether the candidate node satisfies a preset condition of operator fusion.

Further, according to an implementation of the present disclosure, generating the fusion operator includes generating the code of the fusion operator.

Before fusion, each operator may form the code individually. For example, before fusion, modes of execution of these four operators including add2, conv4, relu2, and conv3 are:

```
//conv3 operator
for x in range(0, 720, h_conv3):
  for y in range(0, 1280, w_conv3):
    T_input=slice_padding(input, x, y, h_conv3+2, w_conv3+2)
    T_conv3=conv(T_input, h_conv3+2, w_conv3+2)
    output[x*32:(x+h_conv3) *32][y*32:(y+w_conv3) *32]=T_conv3
input' = output
input = output
//relu2 operator
for x in range(0, 720, h_relu2):
  for y in range(0, 1280, w_relu2):
    T_input=input[x*32:(x+h_relu2) *32][y*32:(y+w_relu2) *32]
    T_relu2=relu(T_input, h_relu2, w_relu2)  //operation representing relu2 operator
    output[x*32:(x+_hrelu2) *32][y*32:(y+w_relu2) *32]=T_relu2
input = output
//conv4 operator
for x in range(0, 720, h_conv4):
  for y in range(0, 1280, w_conv4):
    T_input=slice_padding(input, x, y, h_conv4+2, w_conv4+2)
    T_conv4=conv(T_input, h_conv4+2, w_conv4+2)  //convolution operation representing
conv4 operator
    output[x*32:(x+h_conv4) *32][y*32:(y+w_conv4) *32]=T_conv4
input = output
//add2 operator
for x in range(0, 720, h_add2):
  for y in range(0, 1280, w_add2):
    T_input1= input[x*32:(x+h_add2) *32][y*32:(y+w_add2) *32]
T_input2= input'[x*32:(x+h_add2) *32][y*32:(y+w_add2) *32]
    T_add2=add(T_input1, T_input2, h_add2, w_add2)  //operation representing add2 operator
    output[x*32:(x+h_add2) *32][y*32:(y+w_add2) *32]=T_add2
```

The omission of some parameters in the conv, relu, add2, and slice_padding functions does not affect the description of this implementation.

After fusion, the code of the fusion operator may be generated. A mode of execution for obtaining a new fusion operator block after fusion may be:

```
for x in range(0, 720, h):
  for y in range(0, 1280, w):
    T_input=slice__padding(input, x, y, h+4, w+4)
    T_conv3=conv(T_input, h+4, w+4)   //convolution operation representing conv3
operator
    T_relu2=relu(T_conv3, h+2, w+2)   //operation representing relu2 operator
    T_conv4=conv(T_input, h+2, w+2)   //convolution operation representing conv4
operator
    T_input=slice__padding(T_input, x, y, h, w)
    T_add2=add(T_input, T_conv4, h, w)   //operation representing add2 operator
    output[x*32:(x+h) *32][y*32:(y+w) *32]=T_add2.
```

The above code is only an illustrative description of the present disclosure, and each individual operator and fusion operator block will be expressed differently depending on different operators and neural network structures.

The present disclosure also provides an electronic device, including: one or a plurality of processors; and a memory, on which a computer-executable instruction is stored, where when the computer-executable instruction is run by the one or the plurality of processors, the electronic device performs the method described above.

The present disclosure also provides a computer-readable storage medium, including a computer-executable instruction, where when the computer-executable instruction is run by one or a plurality of processors, the method described above is performed.

The disclosed technical solution is tested in the following test environment: based on an artificial intelligence chip, on a computer with a Linux operating system, and using a SRResNet supersampling network. Test results show that by using the method of the present disclosure, running time of the whole network is 31 ms, which is ½ of running time when the method is not used. However, by using other existing methods, the running time is greater than 31 ms. Obviously, the solution of the present disclosure significantly improves running efficiency of the neural network.

The solution of the present disclosure provides a data locality optimization method for a deep learning supersampling network. Through operator fusion and data splitting, time of running an image supersampling network on a multilevel on-chip storage processor, especially a graphics processing unit (GPU) or deep learning-dedicated processor, is reduced. The method of the present disclosure may be applied to the GPU and other deep learning-dedicated processors with a multilevel high-speed on-chip memory.

The technical solution of the present disclosure may be applied to the field of artificial intelligence and may be implemented as or may be implemented in an artificial intelligence chip. The chip may stand alone or may be included in a computing processing apparatus.

Figure 12:
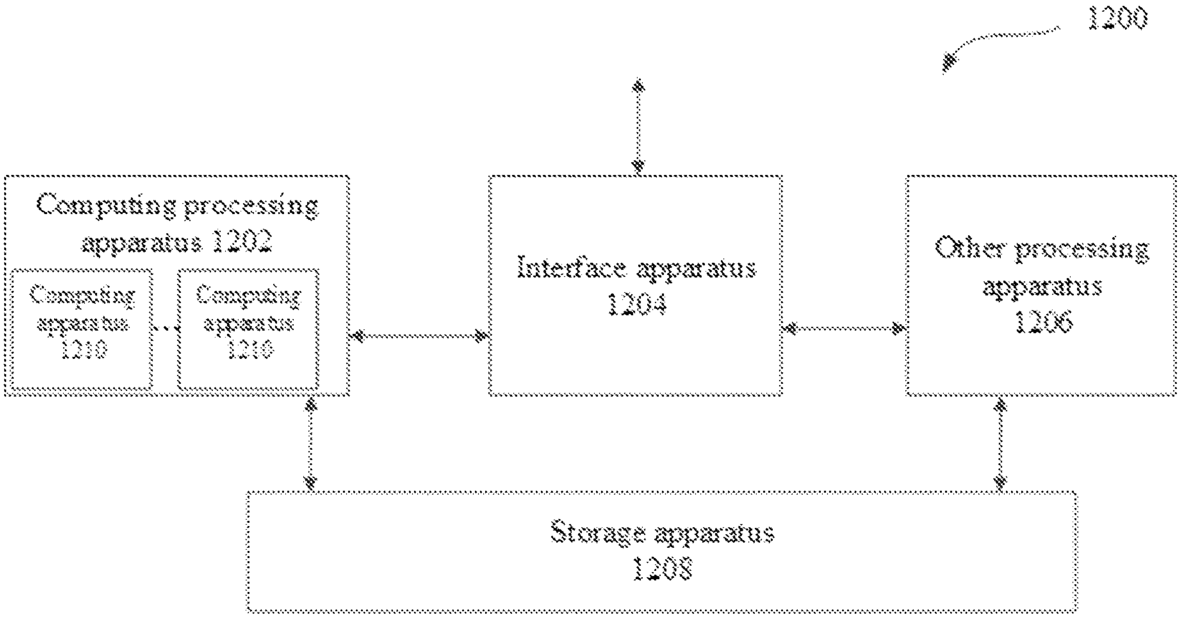
FIG. 12 is a combined processing apparatus.

FIG. 12 shows a combined processing apparatus 1200, including the above computing processing apparatus 1202, an interface apparatus 1204, and other processing apparatus 1206. According to the present disclosure, the computing processing apparatus interacts with other processing apparatus to jointly complete an operation specified by a user. FIG. 12 is a schematic diagram of the combined processing apparatus.

Other processing apparatus includes one or more types of general-purpose/special-purpose processors, such as a central processing unit (CPU), a graphics processing unit (GPU), a neural network processor, and the like. A count of processors included in other processing apparatus is not limited. Other processing apparatus serves as an interface between a machine learning operation apparatus and external data and control, and completes basic controls, such as moving data, starting and stopping the machine learning operation apparatus; and other processing apparatus may also cooperate with the machine learning operation apparatus to complete an operation task.

The interface apparatus is configured to transfer data and a control instruction between the computing processing apparatus (such as the machine learning operation apparatus) and other processing apparatus. The computing processing apparatus acquires required input data from other processing apparatus and write the data in an on-chip storage apparatus of the computing processing apparatus. The computing processing apparatus may also acquire the control instruction from other processing apparatus and write the control instruction in an on-chip control cache of the computing processing apparatus. The computing processing apparatus may further read data stored in a storage unit of the computing processing apparatus and transfer the data to other processing apparatus.

Optionally, the structure may further include a storage apparatus 1208. The storage apparatus is connected to the computing processing apparatus and other processing apparatus, respectively. The storage apparatus is configured to store data of the computing processing apparatus and other processing apparatus. The storage apparatus is especially suitable for storing data that may not be completely stored in the internal storage of the computing processing apparatus or other processing apparatus of the present disclosure.

The combined processing apparatus may be used as a system on chip (SOC) of a device including a mobile phone, a robot, a drone, a video surveillance device, and the like, which may effectively reduce a core area of a control component, increase processing speed, and reduce overall power consumption. In this situation, the interface apparatus of the combined processing apparatus is connected to some components of the device. The components include, for example, a webcam, a monitor, a mouse, a keyboard, a network card, and a WIFI interface.

In some embodiments, the present disclosure also provides a chip package structure, including the above chip.

Figure 13:
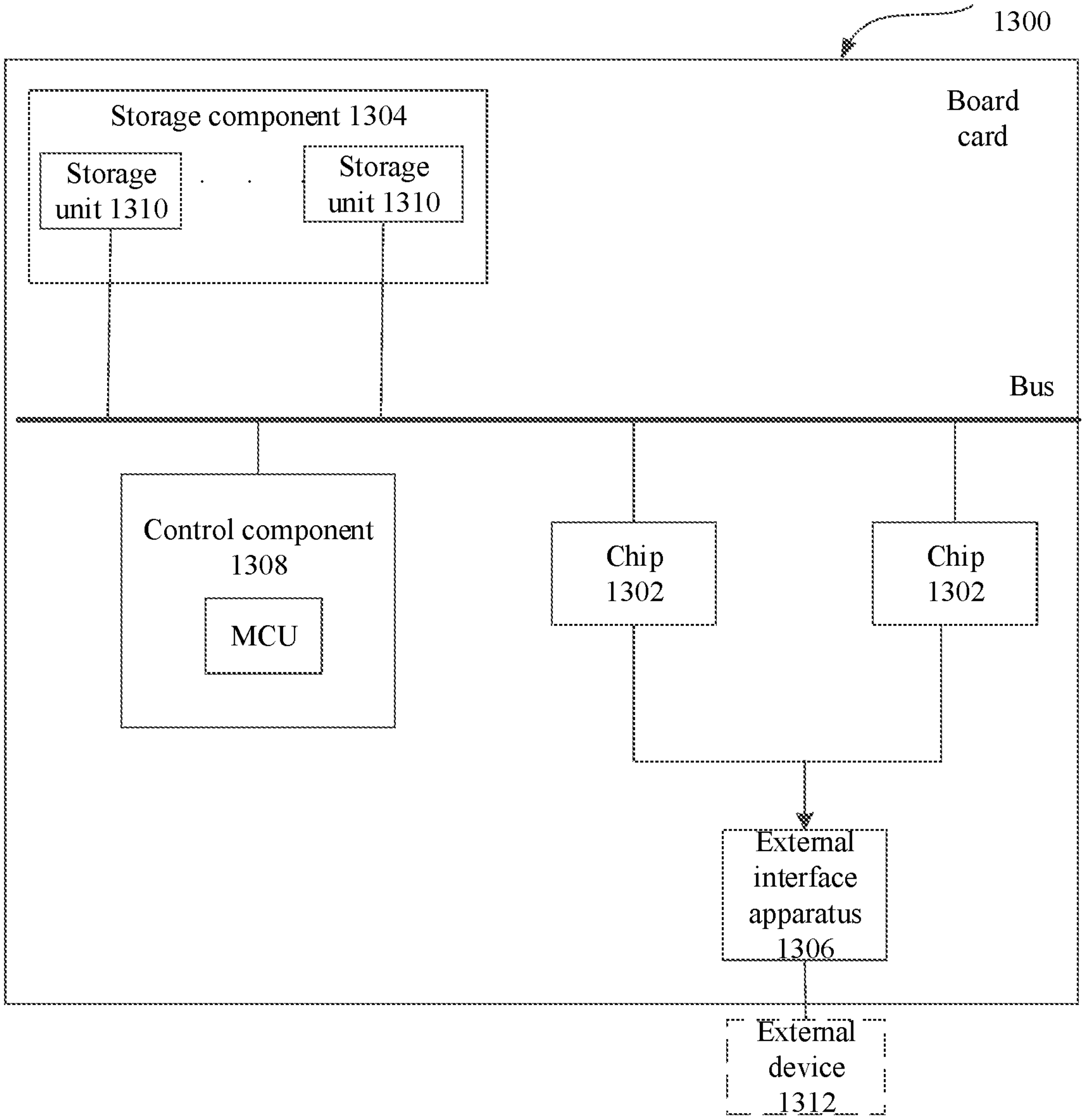
FIG. 13 is an exemplary board card.

In some embodiments, the present disclosure provides a board card, including the above chip package structure. FIG. 13 provides an exemplary board card, which not only includes the above chip 1302, but also includes other supporting components. Other supporting components include but are not limited to: a storage component 1304, an external interface apparatus 1306, and a control component 1308.

The storage component is connected to the chip in the chip package structure through a bus and is used to store data. The storage component may include a plurality of groups of storage units 1310. Each group of storage units is connected to the chip through the bus. It may be understood that each group of the storage units may be a double data rate (DDR) synchronous dynamic random access memory (SDRAM).

The DDR doubles the speed of the SDRAM without increasing clock frequency. The DDR allows data to be read on rising and falling edges of a clock pulse. The speed of the DDR is twice of a standard SDRAM. In an embodiment, the storage component may include four groups of storage units. Each group of storage units may include a plurality of DDR4 particles (chips). In an embodiment, four 72-bit DDR4 controllers may be arranged inside the chip, where 64 bits of the 72-bit DDR4 controller described above are used for data transfer, and 8 bits are used for error checking and correcting (ECC) parity. In an embodiment, each group of storage units includes a plurality of DDR SDRAMs arranged in parallel. The DDR may transfer data twice per clock cycle. A controller for controlling the DDR may be arranged in the chip, and the controller is used to control data transfer and data storage of each storage unit.

The external interface apparatus is electrically connected to the chip in the chip package structure. The external interface apparatus is used to implement data transfer between the chip and an external device 1312 (such as a server or a computer). For example, in an embodiment, the external interface apparatus may be a standard peripheral component interconnect express (PCIe) interface. For instance, to-be-processed data is transferred by the server through the standard PCIe interface to the chip, so as to implement data transfer. In another embodiment, the external interface apparatus may also be other interfaces. The present disclosure does not limit specific forms of other interfaces mentioned above, as long as an interface unit may realize a switching function. Additionally, a computing result of the chip is still sent back to the external device (such as the server) through the external interface apparatus.

The control component is electrically connected to the chip. The control component is used to monitor a state of the chip. Specifically, the chip and the control component may be electrically connected through a serial peripheral interface (SPI). The control component may include a micro controller unit (MCU). If the chip may include a plurality of processing chips, a plurality of processing cores, or a plurality of processing circuits, the chip may be capable of driving a plurality of loads. Therefore, the chip may be in different working states, such as a multi-load state and a light-load state. Through the control component, regulation and control of working states of the plurality of processing chips, processing cores and/or processing circuits in the chip may be realized.

In some embodiments, the present disclosure further discloses an electronic device or apparatus, including the above board card.

The electronic device or apparatus may include a data processing apparatus, a robot, a computer, a printer, a scanner, a tablet, a smart terminal, a mobile phone, a traffic recorder, a navigator, a sensor, a webcam, a server, a cloud server, a camera, a video camera, a projector, a watch, a headphone, a mobile storage, a wearable device, a vehicle, a household appliance, and/or a medical device.

The vehicle may include an airplane, a ship, and/or a car. The household appliance may include a television, an air conditioner, a microwave oven, a refrigerator, an electric rice cooker, a humidifier, a washing machine, an electric lamp, a gas cooker, and a range hood. The medical device may include a nuclear magnetic resonance spectrometer, a B-ultrasonic scanner, and/or an electrocardiogra.

It is required to be explained that for the sake of conciseness, the foregoing method embodiments are all described as a series of combinations of actions, but those skilled in the art should know that the present disclosure is not limited by the described order of action since some steps may be performed in a different order or simultaneously according to the present disclosure. Moreover, those skilled in the art should also understand that embodiments described in the specification are all optional, and actions and units involved are not necessarily required for the present disclosure.

In the above embodiments, the description of each embodiment has its own emphasis. For a part that is not described in detail in a certain embodiment, reference may be made to related descriptions in other embodiments.

In several embodiments provided in the present disclosure, it should be understood that the apparatus disclosed may be implemented in other ways. For instance, the apparatus embodiments above are merely illustrative. For instance, a division of units is only a logical function division. In an actual implementation, there may be other division methods. For instance, a plurality of units or components may be combined or may be integrated in another system, or some features may be ignored or may not be performed. In addition, the displayed or discussed mutual coupling or direct coupling or communication connection may be implemented through indirect coupling or communication connection of some interfaces, apparatuses, or units, and may be in electrical, optical, acoustic, magnetic, or other forms.

Units described as separate components may or may not be physically separated. Components shown as units may or may not be physical units. In other words, the components may be located in one place or distributed to a plurality of network units. According to actual requirements, some or all of the units may be selected for achieving purposes of the embodiments of the present disclosure.

Additionally, each functional unit in each embodiment of the present disclosure may be integrated in one processing unit, or each unit may exist separately and physically, or two or more units may be integrated in one unit. The integrated unit described above may be implemented either in the form of hardware or in the form of a software program unit.

If the integrated unit is implemented in the form of the software program unit and sold or used as an independent product, the integrated unit may be stored in a computer-readable memory. Based on such understanding, when the technical solution of the present disclosure is embodied in the form of a software product, the software product may be stored in a memory. The software product includes several instructions used to enable a computer device (which may be a personal computer, a server, or a network device, and the like) to perform all or part of steps of the method of the embodiments of the present disclosure. The foregoing memory includes: a USB flash drive, a read-only memory (ROM), a random access memory (RAM), a mobile hard disk, a magnetic disk, or an optical disc, and other media that may store program codes.

The embodiments of the present disclosure have been described in detail above. The present disclosure explains principles and implementations of the present disclosure with specific examples. Descriptions of the embodiments above are only used to facilitate understanding of the method and core ideas of the present disclosure. Simultaneously, those skilled in the art may change the specific implementations and application scope of the present disclosure based on the ideas of the present disclosure. In summary, the content of this specification should not be construed as a limitation on the present disclosure.

What is claimed is:

1. A method for fusing operators of a neural network, comprising:

constructing a directed computing graph of the neural network, wherein the directed computing graph comprises a plurality of nodes connected by directed edges;

traversing the plurality of nodes to determine whether a traversed node satisfies a preset condition;

determining an operator corresponding to a node that satisfies the preset condition as a to-be-fused operator to perform fusion to generate a fusion operator;

determining a splitting scheme of tensor data of to-be-fused operators, wherein the splitting scheme comprises sub-tensor functions represented by sub-tensor dimension variables;

determining the sub-tensor dimension variables according to the splitting scheme and a preset storage space;

splitting the tensor data according to the determined sub-tensor dimension variables to obtain sub-tensor data;

wherein determining the sub-tensor dimension variables according to the splitting scheme and the preset storage space comprises:

according to a sub-tensor function of each to-be-fused sub-node, computing a storage space occupied by sub-tensor data represented by the sub-tensor function; and determining a maximum sub-tensor dimension variable when the storage space occupied by the sub-tensor data is less than or equal to the preset storage space, wherein the sub-tensor data represented by the sub-tensor function comprises:

output sub-tensor data of the to-be-fused sub-node;

intermediate sub-tensor data generated when the to-be-fused sub-node is running; and input sub-tensor data of the to-be-fused sub-node;

wherein determining the maximum sub-tensor dimension variable when the storage space occupied by the sub-tensor data is less than or equal to the preset storage space comprises:

determining a maximum storage space occupied by the output sub-tensor data, the intermediate sub-tensor data, and the input sub-tensor data; and determining a tensor dimension variable of sub-tensor data corresponding to the maximum storage space as the maximum sub-tensor dimension variable when the maximum storage space is not greater than the preset storage space.

2. The method of claim 1, wherein traversing the plurality of nodes to determine whether the traversed node satisfies the preset condition comprises:

creating an optimization search sequence according to the plurality of nodes; and traversing the plurality of nodes in the optimization search sequence to determine whether the traversed node satisfies the preset condition.

3. The method of claim 2, wherein creating the optimization search sequence according to the plurality of nodes comprises:

determining output edge counts in the directed edges of the nodes; and determining a node with 0 output edge as a candidate node, and adding the node to a first queue to create the optimization search sequence.

4. The method of claim 3, wherein determining the node with 0 output edge as the candidate node and adding the node to the first queue to create the optimization search sequence comprise:

determining a node with 0 initial output edge as an initial candidate node, and adding the node to the first queue;

subtracting an output edge count of an input node of the initial candidate node by 1 to obtain an updated node with an updated output edge count; and determining an updated node with 0 output edge as the candidate node, and adding the node to the first queue until all nodes are added to the first queue, thus creating the optimization search sequence.

5. The method of claim 4, wherein determining the node with 0 output edge as the candidate node and adding the node to the first queue to create the optimization search sequence further comprise:

creating a first stack configured to store at least one of the plurality of nodes;

ejecting the node from the first stack in response to a case where an output edge count of the node or an updated output edge count of the node is 0; and determining the ejected node as the candidate node, and adding the node to the end of the first queue to create the optimization search sequence.

6. The method of claim 3, wherein traversing the plurality of nodes to determine whether the traversed node satisfies the preset condition comprises:

creating a second queue;

determining the initial candidate node of the first queue as the to-be-fused node, and adding the node to the second queue;

traversing the candidate node in the first queue to determine whether the traversed candidate node satisfies the preset condition; and determining the candidate node that satisfies the preset condition as the to-be-fused node, and adding the node to the second queue if the traversed candidate node satisfies the preset condition.

7. The method of claim 6, further comprising:

determining that the traversed candidate node satisfies the preset condition if a first storage space occupied by the traversed candidate node is less than or equal to a second storage space occupied by a child candidate node of the candidate node.

8. The method of claim 7, further comprising:

determining that the first storage space is less than or equal to the second storage space if the traversed candidate node is an input node of the to-be-fused node in the second queue and the traversed candidate node is an in place operation node.

9. The method of claim 7, further comprising:

determining that the first storage space is less than or equal to the second storage space if the traversed candidate node is an input node of the to-be-fused node in the second queue and the traversed candidate node is a non-in-place operation node, but all to-be-fused nodes in the second queue are in place operation nodes.

10. The method of claim 6, further comprising:

determining that the traversed candidate node satisfies the preset condition if fusion running time after the traversed candidate node is fused with the to-be-fused node in the second queue is less than or equal to first running time, wherein the first running time is running time when the traversed candidate node is not fused with the to-be-fused node in the second queue.

11. The method of claim 6, further comprising:

determining that the traversed candidate node satisfies the preset condition if fusion running time after the traversed candidate node is fused with the to-be-fused node in the second queue is less than or equal to first running time, wherein the first running time is running time when the traversed candidate node is not fused with the to-be-fused node in the second queue wherein the traversed candidate node is an input node of the to-be-fused node in the second queue, the traversed candidate node is a non-in-place operation node, and part of not all to-be-fused nodes in the second queue are in place operation nodes.

12. The method of claim 1, wherein determining the splitting scheme of the tensor data of the to-be-fused operators comprises:

forming a directed computing sub-graph by the to-be-fused operators, wherein the directed computing sub-graph comprises a plurality of to-be-fused sub-nodes connected by directed edges;

determining a sub-tensor function of an output tensor of a first to-be-fused sub-node, wherein the first to-be-fused sub-node is a to-be-fused sub-node with 0 output node; and reversely deriving a sub-tensor function of each of other to-be-fused sub-nodes according to the directed computing sub-graph.

13. The method of claim 12, wherein reversely deriving the sub-tensor function of each of other to-be-fused sub-nodes according to the directed computing sub-graph comprises:

reversely deriving a maximum sub-tensor function of each of other to-be-fused sub-nodes when the to-be-fused sub-node has a plurality of outputs.

14. The method of claim 1, further comprising:

determining a maximum storage space occupied by a sum of the output sub-tensor data, the intermediate sub-tensor data, and a plurality of pieces of input sub-tensor data when the to-be-fused sub-node has a plurality of inputs.

15. The method of claim 1, further comprising:

fusing to-be-fused operators corresponding to to-be-fused sub-nodes to obtain the fusion operator; and obtaining running time through sub-tensor data formed by splitting the fusion operator; or evaluating the running time of the sub-tensor data formed by splitting the fusion operator in the fusion operator, wherein the generation of the fusion operator comprises generating the code of the fusion operator.

16. An electronic device, comprising:

one or a plurality of processors; and a memory, on which a computer-executable instruction is stored, wherein when the computer-executable instruction is run by the one or the plurality of processors, the electronic device performs a method for fusing operators of a neural network, comprising:

constructing a directed computing graph of the neural network, wherein the directed computing graph comprises a plurality of nodes connected by directed edges;

traversing the plurality of nodes to determine whether a traversed node satisfies a preset condition;

determining an operator corresponding to a node that satisfies the preset condition as a to-be-fused operator to perform fusion to generate a fusion operator;

determining a splitting scheme of tensor data of to-be-fused operators, wherein the splitting scheme comprises sub-tensor functions represented by sub-tensor dimension variables;

determining the sub-tensor dimension variables according to the splitting scheme and a preset storage space;

splitting the tensor data according to the determined sub-tensor dimension variables to obtain sub-tensor data;

wherein determining the sub-tensor dimension variables according to the splitting scheme and the preset storage space comprises:

according to a sub-tensor function of each to-be-fused sub-node, computing a storage space occupied by sub-tensor data represented by the sub-tensor function; and determining a maximum sub-tensor dimension variable when the storage space occupied by the sub-tensor data is less than or equal to the preset storage space, wherein the sub-tensor data represented by the sub-tensor function comprises:

output sub-tensor data of the to-be-fused sub-node;

intermediate sub-tensor data generated when the to-be-fused sub-node is running; and input sub-tensor data of the to-be-fused sub-node;

wherein determining the maximum sub-tensor dimension variable when the storage space occupied by the sub-tensor data is less than or equal to the preset storage space comprises:

determining a maximum storage space occupied by the output sub-tensor data, the intermediate sub-tensor data, and the input sub-tensor data; and determining a tensor dimension variable of sub-tensor data corresponding to the maximum storage space as the maximum sub-tensor dimension variable when the maximum storage space is not greater than the preset storage space.

17. A non-transitory computer-readable storage medium, comprising a computer-executable instruction, wherein when the computer-executable instruction is run by one or a plurality of processors, a method for fusing operators of a neural network is performed, which comprises:

constructing a directed computing graph of the neural network, wherein the directed computing graph comprises a plurality of nodes connected by directed edges;

traversing the plurality of nodes to determine whether a traversed node satisfies a preset condition;

determining an operator corresponding to a node that satisfies the preset condition as a to-be-fused operator to perform fusion to generate a fusion operator;

determining a splitting scheme of tensor data of to-be-fused operators, wherein the splitting scheme comprises sub-tensor functions represented by sub-tensor dimension variables;

determining the sub-tensor dimension variables according to the splitting scheme and a preset storage space;

splitting the tensor data according to the determined sub-tensor dimension variables to obtain sub-tensor data;

wherein determining the sub-tensor dimension variables according to the splitting scheme and the preset storage space comprises:

according to a sub-tensor function of each to-be-fused sub-node, computing a storage space occupied by sub-tensor data represented by the sub-tensor function; and determining a maximum sub-tensor dimension variable when the storage space occupied by the sub-tensor data is less than or equal to the preset storage space, wherein the sub-tensor data represented by the sub-tensor function comprises:

output sub-tensor data of the to-be-fused sub-node;

intermediate sub-tensor data generated when the to-be-fused sub-node is running; and input sub-tensor data of the to-be-fused sub-node;

wherein determining the maximum sub-tensor dimension variable when the storage space occupied by the sub-tensor data is less than or equal to the preset storage space comprises:

determining a maximum storage space occupied by the output sub-tensor data, the intermediate sub-tensor data, and the input sub-tensor data; and determining a tensor dimension variable of sub-tensor data corresponding to the maximum storage space as the maximum sub-tensor dimension variable when the maximum storage space is not greater than the preset storage space.

* * * * *